(12) United States Patent
Rumelhart

(10) Patent No.: US 7,930,362 B2
(45) Date of Patent: *Apr. 19, 2011

(54) TECHNIQUES FOR DELIVERING PERSONALIZED CONTENT WITH A REAL-TIME ROUTING NETWORK

(75) Inventor: Karl E. Rumelhart, Palo Alto, CA (US)

(73) Assignee: Shaw Parsing, LLC, Los Altos, CA (US)

( * ) Notice: Subject to any disclaimer, the term of this patent is extended or adjusted under 35 U.S.C. 154(b) by 1175 days.

This patent is subject to a terminal disclaimer.

(21) Appl. No.: 11/205,233

(22) Filed: Aug. 15, 2005

(65) Prior Publication Data

US 2006/0041681 A1    Feb. 23, 2006

Related U.S. Application Data

(63) Continuation-in-part of application No. 10/017,182, filed on Dec. 14, 2001, now Pat. No. 7,043,525.

(60) Provisional application No. 60/602,539, filed on Aug. 17, 2004, provisional application No. 60/276,847, filed on Mar. 16, 2001, provisional application No. 60/256,613, filed on Dec. 18, 2000, provisional application No. 60/278,303, filed on Mar. 21, 2001, provisional application No. 60/279,608, filed on Mar. 28, 2001, provisional application No. 60/280,627, filed on Mar. 29, 2001.

(51) Int. Cl.
*G06F 15/16* (2006.01)
*G06F 15/173* (2006.01)
*G06F 3/048* (2006.01)
*G06Q 30/00* (2006.01)

(52) U.S. Cl. ........... 709/217; 709/238; 715/713; 705/56

(58) Field of Classification Search ................ 709/238, 709/217–219, 201–203, 227–229; 370/392; 707/1, 10; 705/26; 715/513

See application file for complete search history.

(56) References Cited

U.S. PATENT DOCUMENTS 5,230,048 A    7/1993    Moy (Continued)

FOREIGN PATENT DOCUMENTS

CN    101057476 A    10/2007

(Continued)

OTHER PUBLICATIONS

Gribble, et al.; "The Ninja Architecture for Robust Internet-scale Systems and Services;" *Computer Networks*; 2001; pp. 473-497; vol. 35; Elsevier Science B.V.

(Continued)

*Primary Examiner* — William C Vaughn, Jr.
*Assistant Examiner* — Muktesh G Gupta
(74) *Attorney, Agent, or Firm* — Sterne, Kessler, Goldstein & Fox P.L.L.C.

(57) ABSTRACT

Techniques for dynamically updating a live object with personalized content for clients are provided. The techniques include receiving a first message from a source including a first identifier and a second identifier. The first identifier may be unique to a client. The second identifier may be generic across many clients. The first message includes information for updating a property of a live object associated with the second identifier. A client specific to the first identifier may be identified. A second message may then be routed through a network to the client. The second message may include the first identifier and the second identifier and also may contain information for updating a property of the live object associated with the second identifier. The client may receive the second message and may be capable of causing an update of the property of the live object associated with the second identifier.

32 Claims, 11 Drawing Sheets

U.S. PATENT DOCUMENTS

| | | |
|---|---|---|
| 5,535,335 A | 7/1996 | Cox et al. |
| 5,692,193 A | 11/1997 | Jagannathan et al. |
| 5,699,523 A | 12/1997 | Li et al. |
| 5,706,516 A | 1/1998 | Chang et al. |
| 5,754,939 A * | 5/1998 | Herz et al. ............... 455/3.04 |
| 5,822,543 A | 10/1998 | Dunn et al. |
| 5,878,420 A | 3/1999 | de la Salle |
| 5,886,643 A | 3/1999 | Diebboll et al. |
| 5,933,429 A | 8/1999 | Bubenik et al. |
| 5,938,733 A | 8/1999 | Heimsoth et al. |
| 5,964,839 A | 10/1999 | Johnson et al. |
| 5,974,457 A | 10/1999 | Waclawsky et al. |
| 6,018,619 A | 1/2000 | Allard et al. |
| 6,029,175 A | 2/2000 | Chow et al. |
| 6,052,447 A | 4/2000 | Golden et al. |
| 6,055,493 A | 4/2000 | Ries et al. |
| 6,094,681 A | 7/2000 | Shaffer et al. |
| 6,112,240 A | 8/2000 | Pogue et al. |
| 6,138,158 A | 10/2000 | Boyle et al. |
| 6,173,406 B1 | 1/2001 | Wang et al. |
| 6,233,600 B1 | 5/2001 | Salas et al. |
| 6,240,451 B1 | 5/2001 | Campbell et al. |
| 6,253,167 B1 | 6/2001 | Matsuda et al. |
| 6,308,209 B1 | 10/2001 | Lecheler |
| 6,314,459 B1 | 11/2001 | Freeman |
| 6,324,587 B1 | 11/2001 | Trenbeath et al. |
| 6,363,421 B2 | 3/2002 | Barker et al. |
| 6,366,926 B1 | 4/2002 | Pohlmann et al. |
| 6,405,245 B1 * | 6/2002 | Burson et al. ............... 709/217 |
| 6,408,282 B1 | 6/2002 | Buist |
| 6,418,448 B1 | 7/2002 | Sarkar |
| 6,418,467 B1 | 7/2002 | Schweitzer et al. |
| 6,446,257 B1 | 9/2002 | Pradhan et al. |
| 6,449,638 B1 * | 9/2002 | Wecker et al. ............... 709/217 |
| 6,460,036 B1 * | 10/2002 | Herz ............... 707/10 |
| 6,480,883 B1 | 11/2002 | Tsutsumitake |
| 6,484,143 B1 | 11/2002 | Swildens et al. |
| 6,502,131 B1 | 12/2002 | Vaid et al. |
| 6,539,427 B1 | 3/2003 | Natarajan et al. |
| 6,553,413 B1 * | 4/2003 | Leighton et al. ............... 709/219 |
| 6,560,611 B1 | 5/2003 | Nine et al. |
| 6,567,411 B2 | 5/2003 | Dahlen |
| 6,577,328 B2 | 6/2003 | Matsuda et al. |
| 6,606,596 B1 * | 8/2003 | Zirngibl et al. ............... 704/270 |
| 6,606,643 B1 | 8/2003 | Emens et al. |
| 6,609,138 B1 | 8/2003 | Merriam |
| 6,654,804 B1 | 11/2003 | Fleming |
| 6,658,652 B1 | 12/2003 | Alexander et al. |
| 6,687,729 B1 | 2/2004 | Sievert et al. |
| 6,691,165 B1 | 2/2004 | Bruck et al. |
| 6,725,446 B1 | 4/2004 | Hahn et al. |
| 6,728,747 B1 | 4/2004 | Jenkins et al. |
| 6,745,224 B1 * | 6/2004 | D'Souza et al. ............... 709/202 |
| 6,751,663 B1 | 6/2004 | Farrell et al. |
| 6,769,009 B1 * | 7/2004 | Reisman ............... 709/201 |
| 6,789,115 B1 | 9/2004 | Singer et al. |
| 6,792,458 B1 | 9/2004 | Muret et al. |
| 6,829,642 B1 | 12/2004 | Giroir et al. |
| 6,836,886 B2 | 12/2004 | Tuerke et al. |
| 6,871,346 B1 | 3/2005 | Kumbalimutt et al. |
| 6,918,084 B1 * | 7/2005 | Slaughter et al. ............... 715/205 |
| 6,970,924 B1 | 11/2005 | Chu et al. |
| 7,020,082 B2 | 3/2006 | Bhagavath et al. |
| 7,043,525 B2 | 5/2006 | Tuttle et al. |
| 7,051,070 B2 | 5/2006 | Tuttle et al. |
| 7,099,926 B1 * | 8/2006 | Ims et al. ............... 709/217 |
| 7,107,326 B1 * | 9/2006 | Fijolek et al. ............... 709/220 |
| 7,127,720 B2 * | 10/2006 | Cano et al. ............... 719/310 |
| 7,139,844 B2 * | 11/2006 | Smith et al. ............... 709/250 |
| 7,159,034 B1 | 1/2007 | Rai |
| 7,206,805 B1 * | 4/2007 | McLaughlin, Jr. ............... 709/203 |
| 7,207,043 B2 | 4/2007 | Blythe et al. |
| 7,209,959 B1 | 4/2007 | Campbell et al. |
| 7,249,197 B1 * | 7/2007 | Roestenburg et al. ............... 709/246 |
| 7,263,547 B2 * | 8/2007 | Kloba et al. ............... 709/217 |
| 7,277,917 B2 * | 10/2007 | Tuttle et al. ............... 709/203 |
| 7,293,074 B1 | 11/2007 | Jellinek et al. |
| 7,350,213 B2 | 3/2008 | Deutesfeld et al. |
| 7,412,518 B1 * | 8/2008 | Duigou et al. ............... 709/227 |
| 7,426,721 B1 * | 9/2008 | Saulpaugh et al. ............... 717/144 |
| 7,430,610 B2 | 9/2008 | Pace et al. |
| 7,516,177 B2 * | 4/2009 | Knapp et al. ............... 709/203 |
| 7,565,359 B2 * | 7/2009 | Nazem et al. ............... 707/10 |
| 2001/0012299 A1 | 8/2001 | Dahlen |
| 2001/0047426 A1 * | 11/2001 | Hunter ............... 709/238 |
| 2002/0010757 A1 * | 1/2002 | Granik et al. ............... 709/218 |
| 2002/0013852 A1 * | 1/2002 | Janik ............... 709/231 |
| 2002/0024536 A1 * | 2/2002 | Kahan et al. ............... 345/745 |
| 2002/0056004 A1 * | 5/2002 | Smith et al. ............... 709/227 |
| 2002/0073165 A1 * | 6/2002 | McNulty et al. ............... 709/217 |
| 2002/0078251 A1 | 6/2002 | Lewis |
| 2002/0087630 A1 | 7/2002 | Wu |
| 2002/0091736 A1 * | 7/2002 | Wall ............... 707/513 |
| 2002/0095399 A1 * | 7/2002 | Devine et al. ............... 707/1 |
| 2002/0120717 A1 | 8/2002 | Giotta |
| 2002/0123359 A1 * | 9/2002 | Wei et al. ............... 455/466 |
| 2003/0026254 A1 * | 2/2003 | Sim ............... 370/392 |
| 2003/0041110 A1 | 2/2003 | Wenocur et al. |
| 2003/0120817 A1 | 6/2003 | Ott et al. |
| 2003/0140111 A1 * | 7/2003 | Pace et al. ............... 709/214 |
| 2004/0139433 A1 | 7/2004 | Blythe et al. |
| 2004/0148606 A1 | 7/2004 | Hosoe |
| 2004/0199926 A1 | 10/2004 | Gilgen et al. |
| 2004/0215493 A1 | 10/2004 | Koppes et al. |
| 2005/0027815 A1 | 2/2005 | Christodoulou et al. |
| 2005/0033841 A1 | 2/2005 | McCarthy et al. |
| 2005/0125557 A1 | 6/2005 | Vasudevan et al. |
| 2005/0278726 A1 | 12/2005 | Cano et al. |
| 2006/0031282 A1 | 2/2006 | Tuttle et al. |
| 2006/0031283 A1 | 2/2006 | Tuttle et al. |
| 2006/0075279 A1 | 4/2006 | Cameros et al. |
| 2006/0117318 A1 | 6/2006 | Rumelhart et al. |
| 2006/0265488 A1 | 11/2006 | Tuttle et al. |
| 2007/0033293 A1 | 2/2007 | Rumelhart |
| 2007/0050519 A1 | 3/2007 | Cano et al. |
| 2007/0061811 A1 | 3/2007 | Rumelhart et al. |
| 2007/0238922 A1 | 10/2007 | Tomohiko et al. |
| 2009/0077173 A1 | 3/2009 | Lowery et al. |

FOREIGN PATENT DOCUMENTS

| | | |
|---|---|---|
| EP | 0733983 A2 | 9/1996 |
| EP | 0749081 B1 | 11/1998 |
| EP | 0889421 A1 | 1/1999 |
| EP | 1784963 | 5/2007 |
| JP | 2000-020423 A | 1/2000 |
| JP | 2008515032 T | 5/2008 |
| KR | 1020070095273 | 9/2007 |
| WO | WO 97/16796 A1 | 5/1997 |
| WO | WO 01/63837 A2 | 8/2001 |
| WO | WO 2005/046184 A1 | 5/2005 |
| WO | WO 2006/023459 A1 | 3/2006 |

OTHER PUBLICATIONS

Zhao, et al.; "A Workflow-centric Study of Organizational Knowledge Distribution;" *Proceedings of the 33rd Hawaii International Conference on System Sciences*; 2000; pp. 1-10; IEEE.

Franklin et al., "Dissemination-Based Information Systems," IEEE Data Engineering Bulletin, vol. 19, No. 3, Sep. 1996, 9 pages.

Nagami et al., "Toshiba's Flow Attribute Notification Protocol (FANP) Specification," Apr. 1997, RFC 2129, Internet RFC/STD/FYI/BCP Archives [online], [retrieved on May 16, 2002]. Retrived from the Internet: <landfield.com/rfcs/rfc2129.html>, 16 pages.

Strom et al., "Gryphon: An Information Flow Based Approach to Message Brokering," International Symposium on Software Reliability Engineering '98, 1998, 2 pages.

Sturman et al., "Reflection in the Gryphon Message Brokering System," Reflection Workshop of the 13.sup.th ACM Conference on Object Oriented Program Systems, Languages and Applications (OOPSLA '98), 1998, 5 pages.

International DOI Foundation, "Introduction to the Digital Object Identifier," [online]. Apr. 1998 [retrieved on May 16, 2002]. Retrieved from the Internet: <doi.org/introduction.html.>, 4 pages.

Aksoy et al., "Research in Data Broadcast and Dissemination", Proc. 1st Int'l Conf. on Advanced Multimedia Content Processing, Osaka University, Osaka, Japan, Nov. 1998.

Banavar et al., "An Efficient Multicast Protocol for Content-Based Publish-Subscribe Systems," Proc. of the 19th International Conference on Distributed Computing Systems, 1999; 9 pages.

Banavar et al., "Information Flow Based Event Distribution Middleware," Proceedings of the 1999 ICDCS Workshop on Electronic Commerce and Web-Based Applications, 1999, 8 pages.

Aguilera et al., "Matching Events in a Content-based Subscription System," Eighteenth ACM Symposium on Principles of Distributed Computing (PODC '99), Atlanta, GA, May 4-6, 1999, 9 pages.

Banavar et al., "A Case for Message Oriented Middleware," Distributed Computing, 13.sup.th International Symposium, Bratislava, Slavak Republic, Sep. 27-29, 1999, 18 pages.

Aguilera et al., "Efficient Atomic Broadcast Using Deterministic Merge," Symposium on Principles of Distributed Computing, 2000, 10 pages.

Opyrchal et al., "Exploiting IP Multicast in Content-Based Publish-Subscribe Systems," Proceedings of the IFIP/ACM International Conference on Distributed Systems Platforms (Middleware 2000), Apr. 2000, 23 pages.

Caplin Systems Ltd., White Paper "Real Time Text Protocol (RTTP)," Version 1.1, Sep. 2000, 11 pages.

Reuters, "Reuters Market Data Systems and the Trading Solutions Architecture," Version 1.0, Jan. 12, 2001, 51 pages.

Ramamrithan et al., "Dissemination of Dynamic Data on the Internet," [online]. Powerpoint Presentation, Spring 2001, [retrieved on Feb. 6, 2002], 5 pages. Retrieved from the Internet <.cs.umbc.edu/courses/graduate/CMSC69IT/spring.sub.—2001/rlist/amit.ppt>.

ComputerLetter, vol. 17, No. 23, Jul. 16, 2001, pp. 1-8.

ComputerLetter, vol. 17, No. 31, Sep. 24, 2001, pp. 1-6.

ComputerLetter, vol. 17, No. 35, Nov. 5, 2001, pp. 1-6.

Tuttle et al., "Upstream Delivery of Information in a Digital Network", U.S. Appl. No. 09/901,582, filed Jul. 9, 2001.

"Repackaging the Net", ComputerLetter, vol. 17, No. 35, Nov. 5, 2001, pp. 1-5.

"Reckoning with IP", ComputerLetter, vol. 17, No. 37, Nov. 19, 2001, pp. 1-6.

"Persistence Counts", ComputerLetter, vol. 17, No. 23, Jul. 16, 2001, pp. 1, 5-7.

Carmona, David; "Programming the Thread Pool in the NET Framework"; 'Online' Jun. 2002, pp. 1-17, XP002357234; retrieved on Dec. 1, 2005 from the Internet: URL:http://msdn.microsoft.com/library/default.asp?url=/library/en-us/dndotnet/hmtl/progthrepool.asp>, pp. 1-17.

Welsh, Matthew D.; "An Architecture for Highly Concurrent, Well-Conditioned Internet Services"; URL: http://www.eecs.harvard.edu/{mdw/papers/mdw-phdthesis/pdf>, 2005, pp. 48-54, 101, and 113-114.

Written Opinion of the International Searching Authority for International Application No. PCT/US2005/029162, recorded Jan. 17, 2006, 7 pages.

Written Opinion of the International Searching Authority for International Application No. PCT/US2005/029021, recorded Dec. 14, 2005, 10 pages.

Written Opinion of the International Searching Authority for International Application No. PCT/US2005/029158, recorded Jan. 25, 2006, 7 pages.

Non-Final Office Action dated May 3, 2005, 8 pages in U.S. Appl. No. 10/017,182 Tuttle et al., filed Dec. 14, 2001.

U.S. Appl. No. 10/213,269, Cano et al., filed Aug. 5, 2002.

U.S. Appl. No. 10/213,018, Tuttle et al. filed Aug. 5, 2002.

Notice of Allowance dated Jan. 3, 2006, U.S. Appl. No. 10/105,018, Tuttle et al., filed Mar. 21, 2002.

Notice of Allowance dated Jul. 5, 2006, U.S. Appl. No. 10/105,018, Tuttle et al., filed Mar. 21, 2002.

Non-Final Office Action dated Aug. 9, 2005, U.S. Appl. No. 10/213,269, Cano et al., filed Aug. 5, 2002.

Final Office Action dated Jan. 26, 2006, U.S. Appl. No. 10/213,269, Cano et al., filed Aug. 5, 2002.

Notice of Allowance dated Jun. 6, 2006, U.S. Appl. No. 10/213,269, Cano et al., filed Aug. 5, 2002.

Non-Final Office Action dated Feb. 3, 2009, U.S. Appl. No. 11/205,233, Rumelhart et al., filed Aug. 15, 2005.

Non-Final Office Action dated Aug. 6, 2009, U.S. Appl. No. 11/205,233, Rumelhart et al., filed Aug. 15, 2005.

Non-Final Office Action dated Apr. 22, 2008, U.S. Appl. No. 11/205,237, Cameros et al., filed Aug. 15, 2005.

Non-Final Office Action dated Apr. 29, 2009, U.S. Appl. No. 11/205,237, Cameros et al., filed Aug. 15, 2005.

Final Office Action dated Nov. 25, 2008, U.S. Appl. No. 11/205,237, Cameros et al., filed Aug. 15, 2005.

Notice of Allowance dated May 22, 2007, U.S. Appl. No. 11/347,802, Tuttle et al., filed Feb. 3, 2006.

Non-Final Office Action dated Jan. 26, 2007, U.S. Appl. No. 11/347,802, Tuttle et al., filed Feb. 3, 2006.

Non-Final Office Action dated Jul. 23, 2009, U.S. Appl. No. 11/396,251, Tuttle et al., filed Mar. 3, 2006.

Non-Final Office Action dated Mar. 6, 2009, U.S. Appl. No. 11/515,233, Rumelhart et al., filed Aug. 31, 2006.

Non-Final Office Action dated Jan. 19, 2010, U.S. Appl. No. 11/396,251, Tuttle et al., filed Mar. 30, 2006.

Non-Final Office Action dated Feb. 22, 2010, U.S. Appl. No. 11/515,233, Rumelhart et al., filed Aug. 31, 2006.

Final Office Action dated Mar. 23, 2010, U.S. Appl. No. 11/205,263, Rumelhart et al., filed Aug. 15, 2005.

Non-Final Office Action dated Oct. 26, 2009, U.S. Appl. No. 11/205,263, Rumelhart et al., filed Aug. 15, 2005.

Final Office Action dated Oct. 7, 2009, U.S. Appl. No. 11/515,233, Rumelhart et al., filed Aug. 31, 2006.

Final Office Action dated Nov. 24, 2009, U.S. Appl. No. 11/205,237, Rumelhart et al., filed Aug. 15, 2005.

Office Action dated Oct. 9, 2009, Chinese Appl. No. 200580027962.5, 16 pgs.

English Language Abstract for Chinese Pub. No. 101057476, filed Aug. 15, 2005, 1 pg.

English Language Abstract for Japanese Pub. No. 2008515032, filed Aug. 15, 2005, 1 pg.

English Language Abstract for Korean Pub. No. 20070095273, filed Aug. 15, 2005, 1 pg.

Notice of Allowance for U.S. Appl. No. 11/515,233, dated Aug. 5, 2010, 19 pgs.

Office Action for Japanese Pub. No. 2000-020423, dated Dec. 1, 2010, 4 pgs.

* cited by examiner

← 118

| 902-1 | 902-2 | 902-3 |
|---|---|---|
| Market Data | News Headlines | Recent Trades |
| IBM 98.78<br>MSFT 77.01<br>CSCO 54.23 | Personalized Headline #1<br>Generic Headline #1<br>Personalized Headline #2 | 9/4/01, 3.27<br>Sold 100 CSCO<br>9/4/01, 2:12 pm<br>Sold 200 MSFT<br>9/4/01, 10:01 am<br>Bought 100 IBM |

904 points to the Market Data ticker list.

Account Balances

Cash: $23,107.55          Equity: $43,239.04  Margin ($36,750.18)

TECHNIQUES FOR DELIVERING PERSONALIZED CONTENT WITH A REAL-TIME ROUTING NETWORK

CROSS-REFERENCES TO RELATED APPLICATIONS

This application claims priority from co-pending U.S. Provisional Patent Application No. 60/602,539, filed Aug. 17, 2004, entitled "TECHNIQUES FOR DELIVERING PERSONALIZED CONTENT WITH A REAL-TIME ROUTING NETWORK, MODULAR EVENT-DRIVEN ARCHITECTURE, MODULAR EVENT-DRIVEN PROCESSING AND VIEWER FAILOVER TESTING A SYSTEM MEMORY WHILE AN OPERATING SYSTEM IS ACTIVE"; and is a continuation in part of U.S. patent application Ser. No. 10/017,182, entitled "ASYNCHRONOUS MESSAGING USING A DYNAMIC ROUTING NETWORK", filed Dec. 14, 2001, now U.S. Pat. No. 7,043,525, which claims priority from U.S. Provisional Application No. 60/256,613, filed Dec. 18, 2000, U.S. Provisional Application No. 60/276,847, filed Mar. 16, 2001, U.S. Provisional Application No. 60/278,303, filed Mar. 21, 2001, U.S. Provisional Application No. 60/279,608, filed Mar. 28, 2001, U.S. Provisional Application No. 60/280,627, filed Mar. 29, 2001. All of the above applications are hereby incorporated by reference, as if set forth in full in this document, for all purposes.

BACKGROUND

Embodiments of the disclosure generally relate to transferring information through networks and in particular to transferring personalized information for remotely updating content at client devices through the networks.

Users may download many different kinds of content from the World Wide Web. For example, users may download content using web pages. In some cases, users may subscribe to services that send content that the users' desire to the web pages. Content providers may need to keep track of which users registered for which content. In addition to keeping track of which users registered for which content, the service providers may also need to know how to send the content that each user registered for. This may require a large amount of resources to keep track of the users who have registered, the content each user desires, and how to route the content to the users.

BRIEF DESCRIPTION OF THE DRAWINGS

FIG. 9 depicts an example of a web page according to one embodiment;

A further understanding of the nature and the advantages of the embodiments disclosed herein may be realized by reference of the remaining portions of the specification and the attached drawings.

DETAILED DESCRIPTION

In one embodiment, personalized content may be provided to remote clients using a dynamic content routing network. The dynamic content routing network is described first and then delivering personalized content to clients is described.

Dynamic Content Routing Network

Figure 1:
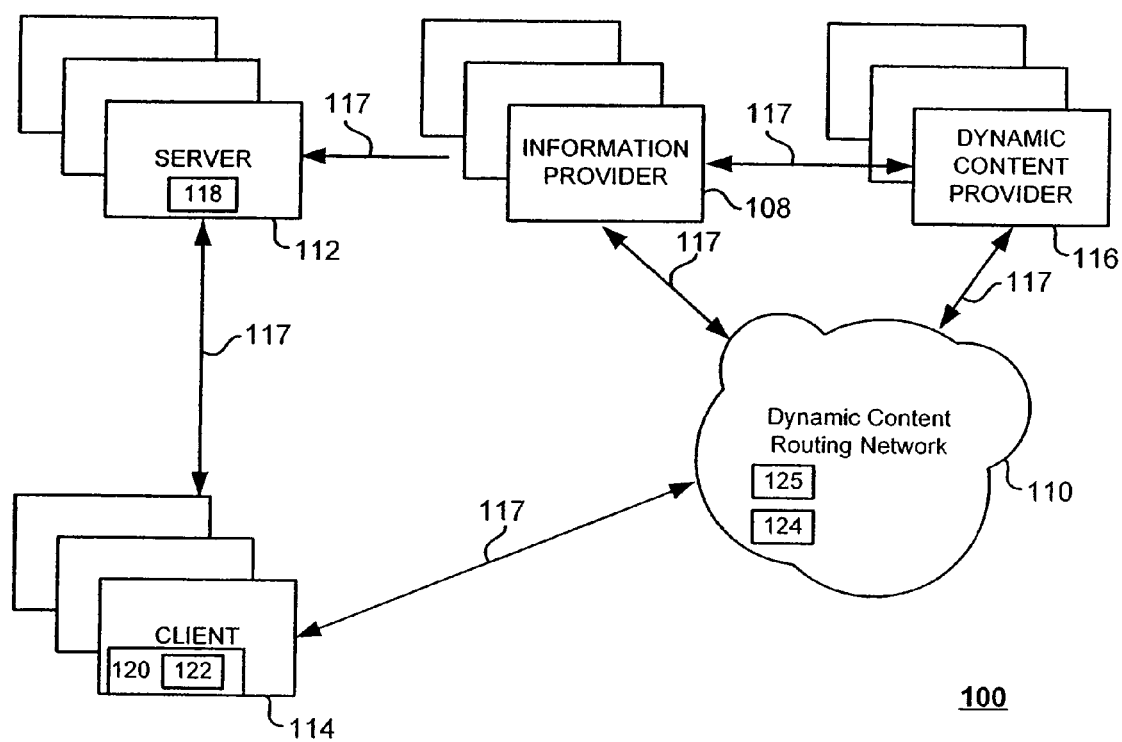
FIG. 1 is a high-level block diagram illustrating an environment containing a dynamic content routing network.

FIG. 1 is a high-level block diagram illustrating an environment 100 containing a dynamic content routing network 110 (hereafter referred to as the "routing network"). The environment 100 also contains a server 112 in communication with a client 114, an information provider 108, and a dynamic content provider 116. Although a typical environment 100 will have hundreds of servers 112 and information providers 108, thousands (or even millions) of clients 114, and multiple dynamic content providers 116, FIG. 1 illustrates only one of each of these entities in order to enhance the clarity of this description.

The server 112, client 114, information provider 108, dynamic content provider 116, and routing network 110 are preferably in communication via conventional communications links 117 such as those comprising the Internet. The communications links 117 include known wired communications media, such as dedicated or shared data, cable television or telephone lines, and/or known wireless communications media, such as communications over the cellular telephone network using protocols such as the global system for mobile communications (GSM), code division multiple access (CDMA), time division multiple access (TDMA), etc.

In one embodiment, the entities may each be in communication with one or more Internet Service Providers (ISPs) (not shown) that provide each entity with access to other computers on the Internet. In addition, the server 112, client 114, information provider 108, dynamic content provider 116, and routing network 110 are preferably each identified by at least one Internet Protocol (IP) address such as "66.35.209.224." The IP address may also have one or more domain names associated with it, such as "bangnetworks.com." Alternative embodiments of the present invention may use alternative addressing schemes and/or naming conventions instead of, or in addition to, those described herein. For example, embodiments wherein one or more of the clients are cellular telephones or other portable devices may rely on different addressing schemes.

Preferably, the information provider 108 provides web pages or other representations of data to the server 112. The web pages contain one or more "live objects," which are designated to be real-time dynamically updateable objects. Each live object is identified by an object identifier, or object ID. Preferably, the server 112 provides the pages 118 to multiple clients 114. The clients 114 contact the routing network 110 and register for update messages for the object IDs on the web page. The routing network 110, in turn, preferably maintains a registry indicating which clients have registered for which object IDs.

The information provider 108 and/or dynamic content provider 116 send update messages to the routing network 110. These messages can be sent any time the information provider 108 or dynamic content provider 116 wants to update a property of a live object. Each update message preferably identifies a live object and contains data for updating a property of the identified live object. The routing network 110 accesses the registry and determines which clients have registered for the identified object. Then, the routing network 110 routes the update message to the appropriate clients. Upon receipt of an update message, the clients 114 update the specified property of the live object.

The routing network 110 provides an efficient one-to-many mapping of objects to clients (and by inference of information, a many-to-many mapping of information providers 108/dynamic content providers 116 to clients) through object-based routing. Messages provided by the information provider 108 and/or dynamic content provider 116 to the routing network 110 are not routed to the clients 114 based entirely on a specified destination; more specifically, they are not routed based on the IP address of the client, as in conventional IP routing schemes. Instead, the messages are routed based on the live objects referenced by the message.

The mapping and object-based routing provided by the routing network 110 allow the information provider 108 and dynamic content provider 116 to update properties of live objects at a dynamically changing cross-section of clients in real-time, without requiring the information provider or dynamic content provider to track the clients or web pages being viewed by the clients. The clients 114, in turn, do not need to have any a priori knowledge of object IDs—they "discover" which IDs they should register when they receives the pages 118 from the server 112.

Object-based routing also allows information providers 108 to dynamically update content on web pages without requiring the clients 114 to re-request the content, and without requiring the information providers 108 or servers 112 to maintain connections with the clients. In this manner, significantly more clients can receive updated content from a given information provider 108 than would be possible utilizing conventional client-side request-driven transmission control protocol/Internet Protocol (TCP/IP) connections between the clients and the server 112.

Turning now to the individual entities illustrated in FIG. 1, the server 112 is preferably a conventional computer system configured to act as a web server and serves pages 118 and other data representations to clients 114. The pages 118 provided by the server 112 are associated with one or more information providers 108.

An information provider 108 is an entity providing one or more pages 118, information contained in web pages, and/or other representations of data served by the server 112. The information provider 108 preferably has a conventional computer system coupled to the Internet. In one embodiment, the server 112 is directly controlled by the information provider 108 (e.g., the server is physically located at the information provider and/or is dedicated to serving only the information provider's web pages). In this embodiment, the server 112 and information provider 108 can be treated as the same entity. In an alternative embodiment, the server 112 serves web pages from multiple information providers.

As is known in the art, the pages 118 and other content on the server 112 are specified by uniform resource locators (URLs) having the form "service://server/path/web page." Typically, pages 118 are obtained via the hypertext transport protocol (HTTP) and thus an exemplary URL for retrieving the web page "b1.html" from the web server having the domain name "www.bangnetworks.com" is "http://www.bangnetworks.comn/news/b1.html."

As used herein, a "web page" is a block of data available from the server 112. In the simplest case, a web page is a file written in the hypertext markup language (HTML). The web page may also contain or refer to one or more other blocks of data, such as other files, text, images, applets, video, and/or audio. In addition, the web page may contain instructions for presenting the web page and its content, such as HTML tags and style sheets. The instructions may also be in the Extensible Markup Language (XML), which is related to HTML and adds semantic content to web pages or the Dynamic HTML (DHTML), which adds some dynamic content to web pages. Additionally, the instructions may take the form of one or more programs such as JAVA® applets and JAVASCRIPT® and/or DHTML scripts.

As used herein, the phrase "web page" also refers to other representations of data served by the server 112 regardless of whether these data representations include characteristics of conventional web pages. These data representations include, for example, application programs and data intended for the web browser 120 or other application programs residing at the clients 114 or elsewhere, such as spreadsheet or textual (e.g., word processing) data, etc.

In a preferred embodiment, objects at the client, such as web pages and elements of web pages, can be designated as "live" by the information provider 108. Properties of a live object can be dynamically updated in real-time at the client 114 by the information provider 108 or another entity acting on behalf of the information provider. As used herein, an "object" is any datum or data at the client 114 that can be individually identified or accessed. Examples of objects include elements of web pages such as text characters and strings, images, frames, tables, audio, video, applets, scripts, HTML, XML, and other code forming the web page, variables and other information used by applets, scripts and/or code, URLs embedded in the web page, etc. Application and operating system constructs are also objects. For example, cells of spreadsheets, text in word processor documents, and title bars and messages displayed by the operating system or applications are objects. Preferably, multiple objects can be grouped together into a single, logical object. Thus, an object can be defined at any desired or useful level of granularity.

Since content on a web page is conceptualized and organized by "object," the present invention essentially abstracts web pages and web page content, and other modules and/or functionality at the client 114, away from the HTML code or other conventional representation. This abstraction allows the information provider 108 to update a property of an object without concern for the location, display format, or other specifics of how the data is being represented at the client 114.

Live objects have associated "properties" which include any modifiable data related to the object or referenced with respect to the object. The information provider 108 typically, but not necessarily, provides initial settings for the properties of live objects provided to the client 114. The properties may or may not affect the visual representation of the object in the web page or other data representation. A property may affect an internal aspect of the object and, thus, a change to the property may not have any direct effect on a web page containing the object. For example, the property may affect whether particular aspects of the object are modifiable, how the object responds to user input or other stimuli, etc. Additionally, a property may also have a direct effect on how the object is displayed at the client 114. For example, the property may affect the content, color, typeface, size, formatting, or other attribute of text, images, or other data displayed by the object. Other properties may occupy parts of the spectrum between having no effect on the visible representation of the object and having a direct effect on the visible representation of the object. For example, a web page showing scores of football games may include a list of games and the current scores of the games as of the time the server 112 serves the web page. The list of games, subset of games to be displayed, and the scores of the games can be designated as live objects (or properties of a single live object) and updated as necessary or desired.

A property can also preferably include instantiating an instance of the object or invoking functionality of the object. For example, a property of a browser window object may include functionality for instantiating another browser window. This function can be invoked as a logical change to a property of the object. The second browser window can be referenced through the original browser window (i.e., object) or designated as a new live object.

An information provider 108 or other entity preferably updates a live object at a client 114 via an update message. In general, an update message identifies the live object and, if necessary, the property of the live object, and contains data for updating the property. In one embodiment, the data may be the actual value for the property or executable code for causing the object's property to be updated. For example, the data may be a simple numerical or textual value, e.g., "4," to which the property should be set, and/or the data may be JAVASCRIPT® code or a call to a JAVASCRIPT® function at the client that effects the desired change to the property of the object.

The update message preferably implicitly or explicitly identifies a handler at the client 114 for use in updating the live object's property. In one embodiment, the client 114 utilizes a default handler when the message implicitly specifies the handler (e.g. when the message does not identify a specific handler). In one embodiment, if the update message specifies the actual value for the property, a default handler generates JAVASCRIPT® code for changing the property to the specified value. If the data in the update message are JAVASCRIPT® code, the default handler does not perform any processing of the code. In either case, the default handlers preferably use LiveConnect to execute the JAVASCRIPT® code in a Java Virtual Machine (JVM) 122 at the client 114 and thereby update the property of the live object.

For certain objects and/or data types, the default handlers are not appropriate. In these cases, the message preferably explicitly identifies a handler for performing the update. For example, the message may explicitly specify a function to call on the data or the message may explicitly identify the environment in which the data should be executed. For example, the data in the update message may include code for execution by a software "plug-in" such as MACROMEDIA FLASH® and the message may explicitly identify FLASH as the handler.

The information provider 108 preferably designates an object as "live" by including a unique identifier for the object, the object ID, in the web page or other data representation provided to the client 114. In one embodiment, the information provider 108 encodes the object ID in an object's corresponding HTML "ID" attribute using the following HTML expression:

ID="elementIdentifier,"

where "elementIdentifier" is the object ID and is preferably a string. The string can encode any information desired by the information provider 108 or other entity establishing the object ID and in one embodiment is a simple textual and/or numeric identifier. In one embodiment, the information provider 108 begins the object ID with a predefined token, such as "Bang$," in order to distinguish live objects from other objects that happen to have defined ID attributes. For example, an object can have the object ID "Bang$elementIdentifier."

In the preferred embodiment, each information provider 108 optionally encodes a unique information provider ID in its object ID in order to prevent naming collisions between the object IDs of different information providers. In one embodiment, the information provider ID is a textual and/or numeric identifier. The information provider 108 may specify the information provider ID and the object ID as part of a hierarchical namespace. For example, in one embodiment objects are named as follows: "$namespace1$[namespace2$ . . . $namespaceN$]objectId," where "$namespace1" is the information provider ID and the "$" operates as the name separator and defines additional optional levels of a namespace hierarchy. One embodiment of the system 100 supports typical directory services functionality. For example, two dollar sign characters appearing together, "$$," refers to the top level of the namespace hierarchy.

Thus, the object ID for a live object is preferably formed from a combination of the predefined token, the information provider ID namespace, and a value assigned by the information provider 108. For example, the object ID for a live object representing the real time price of a stock having the symbol "BANG" might be: "Bang$$informationProviderID$equities$realtime$bang." In this example, "Bang$" is the predefined token that signifies a live object, "$informationProviderID" is the ID identifying the information provider, "$equities$realtime$" defines levels of a namespace hierarchy, and "bang" identifies the specific object.

In some embodiments and situations, the object ID utilizes relative names. For example, an information provider 108 referring to its own object IDs is implicitly in its own namespace. Accordingly, the information provider 108 does not need to include the information Provider ID in the object IDs it utilizes internally. In one embodiment, the information provider ID is not explicitly encoded into the object ID. Instead, the information provider ID is encoded elsewhere in the web page in order to provide scope to the page's object IDs.

In one embodiment, the object ID identifies a point (i.e., a node in a tree) in a Document Object Model (DOM) representation of a web page or other document at the client 114. The DOM is a platform- and language-neutral interface that represents a document as a hierarchy of objects. The DOM also provides an interface that allows programs and scripts to dynamically access and update properties of the objects. Object properties can be inherited by descendent objects.

In this embodiment, the client 114 preferably executes an update message in the context of the specified point in the DOM representation. The update may specify a change to a property of the object at the identified point. The update also may specify a change to a parent or descendent of the object at the identified point. In each case, the update is executed relative to the specified point in the DOM representation. In one embodiment, points in the DOM representation specify how to update properties of live objects located at those points. Thus, the same update may be interpreted differently depending upon the identified live object's location in the DOM representation.

For example, assume there is an object in the DOM representation identified as "window.document.frame[3].ObjectID." Also assume that the object has an "innerText" property located at "window.document.frame[3].ObjectID.innerText" that specifies the text displayed by the object. An update message can change the text displayed by the object by specifying "ObjectID" and the new value for the innerText property.

An advantage of utilizing object IDs to specify objects is that the information provider 108 or other entity providing the update message can access and change properties of objects without knowing the object's actual location in the DOM representation. Indeed, the object may be in different locations in different DOM representations and/or in multiple locations in the same DOM representation. In any of these cases, the update message will change the specified properties of all of the objects having the given object ID.

Depending upon the particular embodiment of the environment 100, the information provider 108 and/or the dynamic content provider 116 provides update messages to the routing network 110. The dynamic content provider 116 is preferably a conventional computer system operated by an entity that provides real-time information, such as stock prices and/or sports scores. In one embodiment, the information provider 108 receives updated properties for the live objects from the dynamic content provider 116 or another source (or generates the updated properties internally). Then, the information provider 108 sends an update message specifying the object ID and the change to the object property to the routing network 110. In this embodiment, the dynamic content provider 116 may be absent from the environment 100.

In another embodiment, the dynamic content provider 116 provides the object IDs for live objects to one or more information providers 108 and the information providers 108 distribute the live objects to the clients 114. Then, the dynamic content provider 116 sends messages specifying the changes to the properties of the live objects to the routing network 110. For example, the dynamic content provider 116 distributes an object ID associated with the score of a particular baseball game to the information providers 108. Then, the dynamic content provider 116 sends a message specifying the object ID and an update to a property of the object that controls the displayed score of the particular baseball game to the routing network 110. These two embodiments are not mutually exclusive and, therefore, some updates may be provided to the routing network 110 by the information provider 108 while others are provided by the dynamic content provider 116.

The client 114 is a device that retrieves pages 118 and/or other information from the server 112. In one embodiment, the client 114 is a conventional personal computer used by a person to access information on the Internet. In alternative embodiments, the client 114 is a different consumer electronic device having Internet connectivity, such as an Internet-enabled television, a cellular telephone, a personal digital assistant (PDA), a web browsing appliance, etc. The client 114 preferably, but not necessarily, has an associated display device.

The client 114 preferably executes a web browser 120, such as MICROSOFT INTERNET EXPLORER®, for retrieving web pages and displaying them on the display device. In embodiments where the client receives data representations from the server 112 other than conventional web pages, the web browser 120 does not necessarily share similarities with conventional web browsers. Preferably, the web browser 120 contains a JVM 122 for executing JAVA® applets and/or scripts. The web browser 120 also preferably contains Dynamic HTML capabilities, such as support for JAVASCRIPT® (or another scripting language, such as VBScript) and the Document Object Model (DOM), and enables communications between JAVA® and the scripting languages. In one embodiment, the web browser 120 supports the LiveConnect standard for enabling communication between JAVA® applets and scripts written in the supported scripting languages. The web browser 120 can also be extended through software plug-ins such as MACROMEDIA FLASH®, REAL NETWORKS REALPLAYER®, and/or APPLE QUICKTIME®. In alternative embodiments, the functionality of the JVM 122 and/or other aspects of the web browser 120 are provided by one or more other functional units within the client 114. The term "module" is used herein to refer to software computer program code and/or any hardware or circuitry utilized to provide the functionality attributed to the module. The web browser 120 and JVM 122 are examples of modules in the client 114.

In some embodiments, the client 114 does not necessarily have a display device, web browser 120 and/or other components associated with a typical consumer device. The client 114, for example, may be a dedicated purpose device having certain aspects of web connectivity such as an embedded HTTP client in a web-enabled appliance or in a controller for an automobile, audio-visual equipment, or some other device.

A page 118 provided from the server 112 to the client 114 preferably includes instructions for enabling the live objects on the web page. The instructions cause the client 114 to automatically and transparently (i.e., without user interaction) contact the routing network 110 and download an activation module 124 for activating the live objects. In one embodiment, the instructions comprise a URL specifying the location of the activation module 124 at the routing network 110. In an alternative embodiment, the client 114 obtains the activation module 124 from the server 112 or another source.

The activation module 124 preferably contains JAVA® instructions for execution by the JVM 122. However, alternative embodiments of the module 124 may encode the instructions in the page 118 and/or the activation module 124 using different languages and/or techniques. For example, the instructions and/or activation module 124 can be embedded in the web browser 120 or operating system, either as native code or as plug-ins. In these alternative embodiments, the web browser 120 does not have to download the activation module 124 from an external source.

The activation module 124 preferably registers object IDs from the page 118 downloaded by the client 114 with the routing network 110 and updates the live objects in response to update messages received from the network. The routing network 110 records the registrations in the registry 125. The client's registrations preferably remain in effect as long as the client is displaying the associated page 118, although other embodiments of the system 100 may use different criteria for determining when to terminate the client's registrations.

Figure 2:
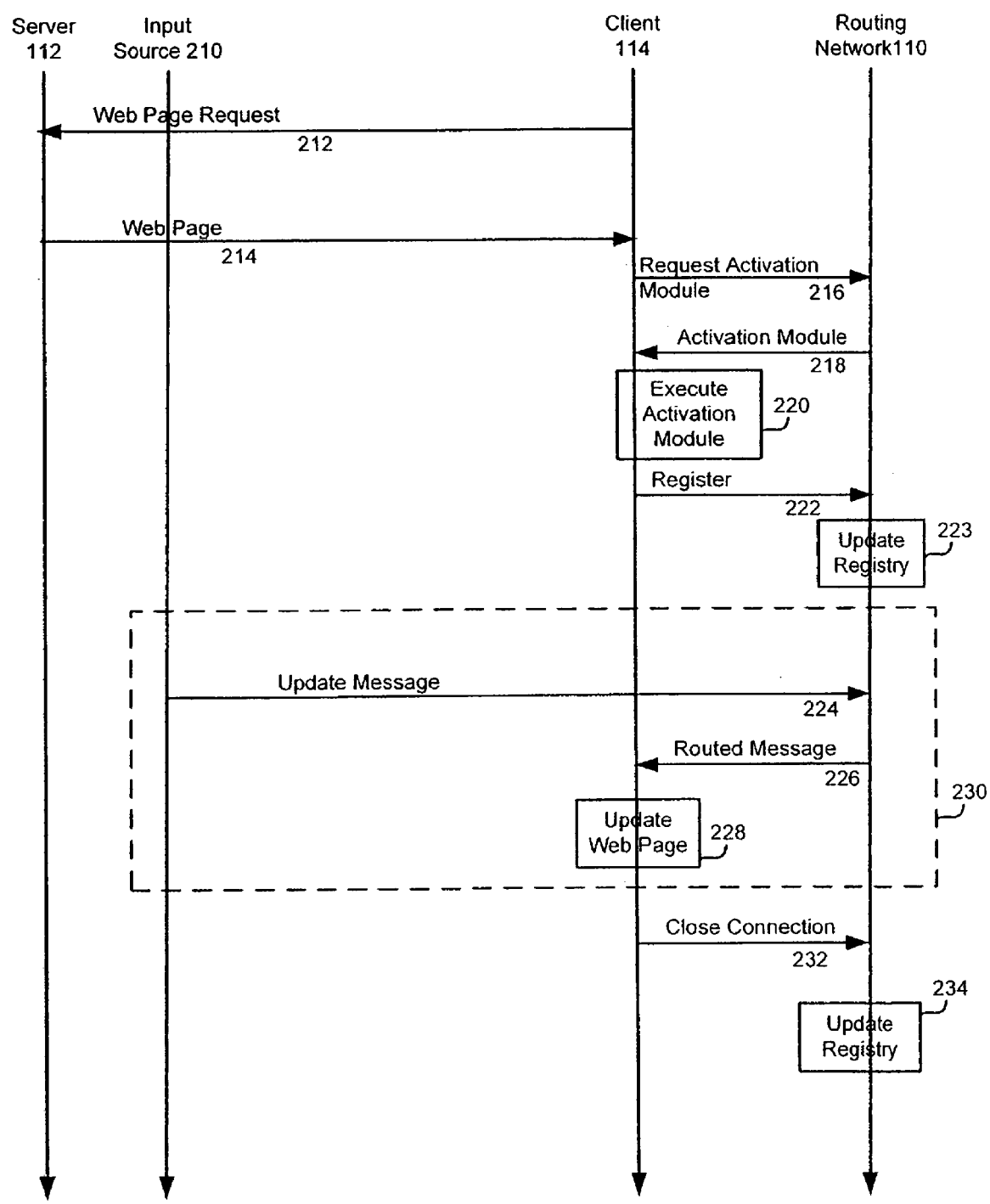
FIG. 2 is an interaction diagram illustrating interactions among a server, information provider, dynamic content provider, client, and routing network to update a property of a live object on a web page.

FIG. 2 is an interaction diagram illustrating interactions among the server 112, information provider 108/dynamic content provider 116 (generically referred to as an "input source 210"), client 114, and the routing network 110 to update a property of a live object. Initially, the client 114 sends 212 a web page request to the server 112. In response, the server 112 provides 214 to the client 114 the web page containing or otherwise identifying the one or more live objects. Instructions encoded in the web page preferably cause the client 114 to transparently request 216 the activation module 124 from the routing network 110. In response, the routing network 110 sends 218 the activation module 124. The client 114 executes 220 the activation module 124, which identifies the object IDs of the live objects at the client and registers 222 the object IDs with the routing network 110. The routing network 110 updates 223 its registry to identify the object IDs for which the client 114 has registered.

At some point, the input source 210 sends 224 an update message to the routing network 110 in order to change a property of a live object at the client 114. In one embodiment, the message from the input source 210 to the routing network 110 contains only a single object ID and an update to a property of the identified object. In another embodiment, the message contains multiple object IDs and the corresponding property updates. In this latter embodiment, the message may have an associated "Batch ID" that identifies the message as having multiple object IDs and updates. Preferably, the information provider 108 can include a batch ID in a page 118 in the same manner as including an object ID. Likewise, the client 114 can preferably register for a batch ID with the routing network 110 in the same manner as an object ID. In fact, the batch ID can be the same as the object ID so that the client 114 registers for both batch and non-batch messages by registering one ID. Alternatively, separate procedures can be established for registering batch messages. The client 114 preferably processes the component messages of a batch as if each message were delivered separately.

The routing network 110, in turn, routes 226 the message to each client 114 that has registered for the specified object ID, preferably by utilizing standard Internet communications protocols, such as IP addresses, etc. The activation module 124 at the client 114 processes the message and updates 228 the property of the identified live object. If live objects having the same object ID appear in multiple locations at the client 114 (e.g., at multiple locations on a web page being displayed at the client), the activation module 124 preferably updates each of the live objects having the specified ID. As a result, the routing network 110 allows live objects at the client 114 to be dynamically updated. Preferably, this routing and updating happens quickly enough to be considered "real-time" for the purposes of the input source 210.

This update process, indicated within the dashed box 230 in FIG. 2, can repeat an indefinite number of times and is fully asynchronous as to the information provider 210 and client 114. For example, the input source 210 may send regular update messages to the routing network 110 as the score of a sporting event changes or a stock price fluctuates, but may stop sending update messages once the sporting event ends or stock market closes. When the client 114 ends the display of a web page containing the live object, or otherwise no longer desires to receive update messages, the client preferably closes 232 the connection with the routing network 110. The routing network 110, in turn, updates 234 the registry 125 to remove the client's object registrations. In another embodiment, the client 114 sends messages to the routing network 110 that selectively register and/or de-register the client from one or more objects yet leaves the connection open in order to receive update messages pertaining to other objects.

Figure 3:
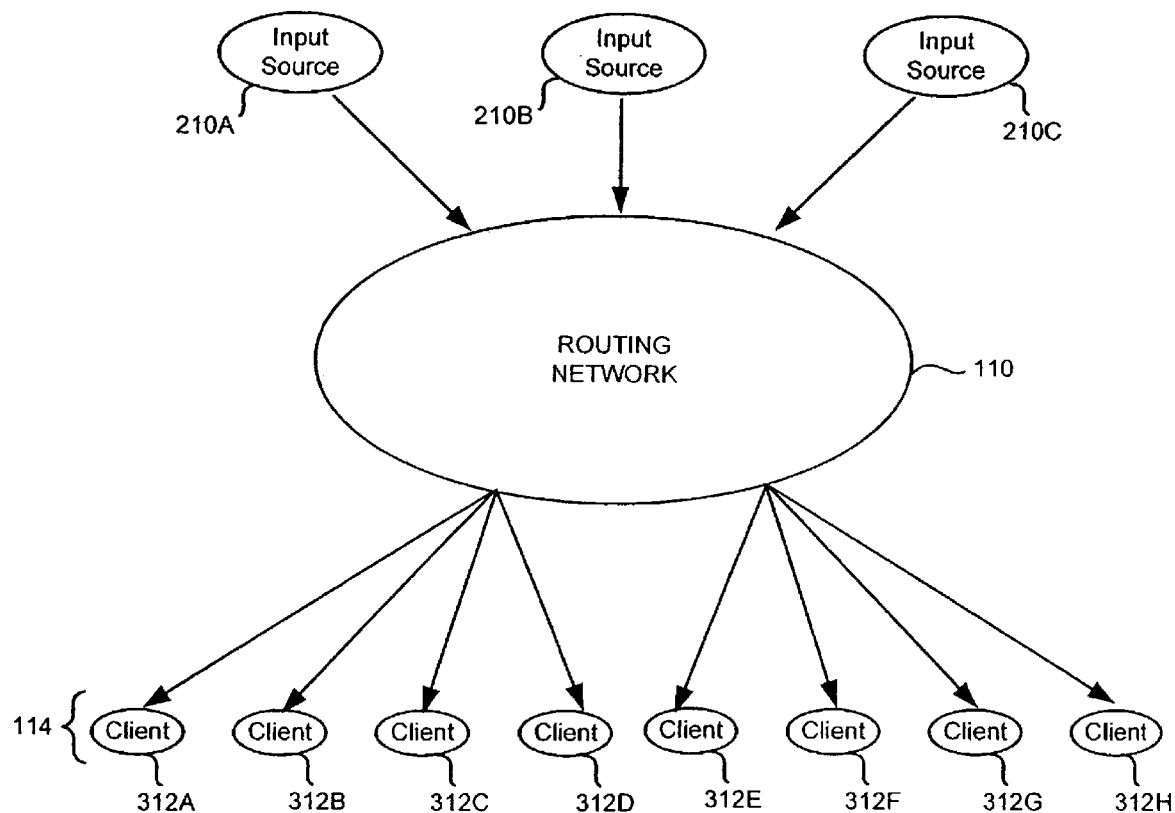
FIG. 3 is a high-level diagram graphically indicating the many-to-many mapping performed by the routing network.

FIG. 3 is a high-level diagram graphically indicating the many-to-many mapping performed by the routing network 110. Multiple input sources (labeled 210A-C) send update messages to the routing network 110. Each update message preferably specifies at least one object ID and an update to a property of the identified object. The routing network 110, in turn, selectively routes the update messages to the clients 114 that have registered for the given object ID from the given input source 210. In FIG. 3, assume for example that clients 312A and 312B have registered for a given object ID while the other clients have not registered for the object ID. Accordingly, the routing network 110 routes the update message to clients 312A and 31213, but does not route the message to clients 312C-312H.

Figure 4:
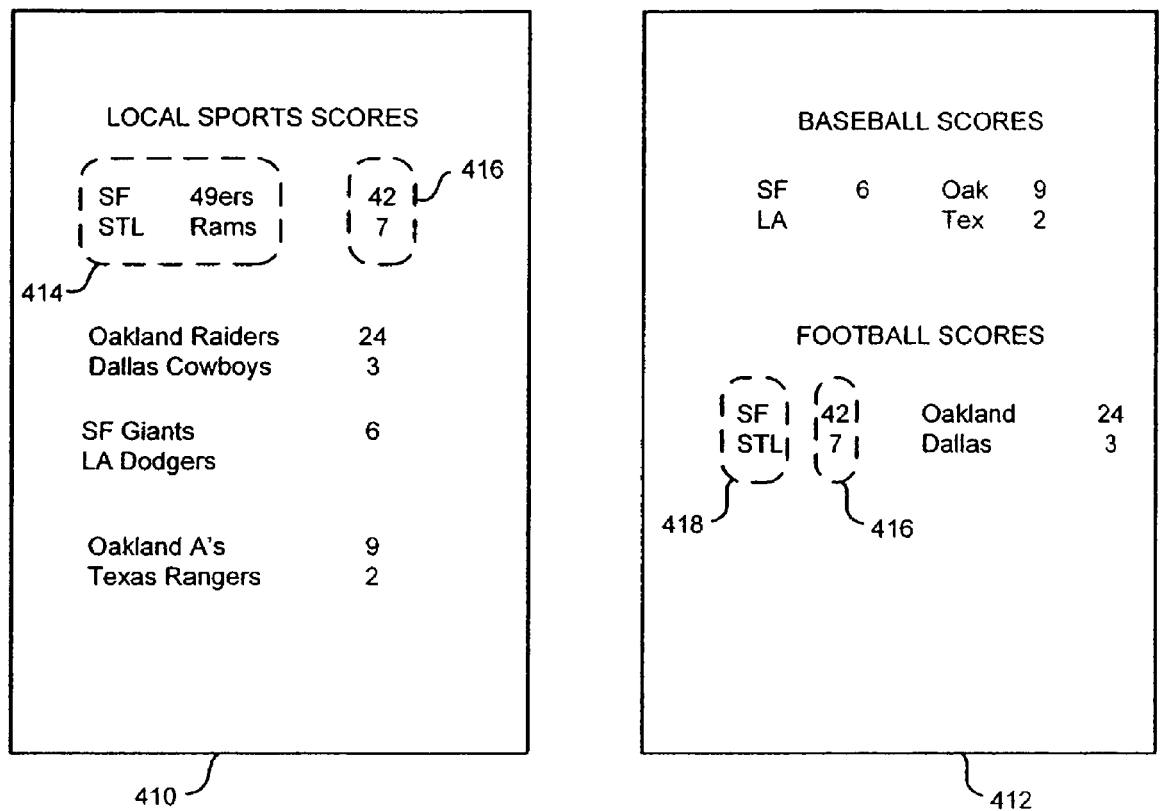
FIG. 4 illustrates two different web pages containing sports scores.

FIG. 4 illustrates an example of the capabilities of the dynamic content routing network 110. FIG. 4 illustrates two different web pages 410, 412 containing sports scores. Although the web pages are formatted differently, each page contains the same scores for two professional football games and two professional baseball games. Web page 410 contains all four games under the heading "Local Sports Scores" while web page 412 contains the baseball games under the heading "Baseball Scores" and the football games under the heading "Football Scores."

There are various ways to internally represent the games and scores in the web pages using live objects. In one embodiment, a "game" object is defined having properties for the two teams involved in the game and the score associated with each team. The game object is placed at a selected position in the web page and the properties of the object cause the information about the game to be displayed on the page. In another embodiment, "team" and "score" objects are defined, with the team object having a property defining the name of a team and the score object having a property defining a score. In this second embodiment, the team and score objects are placed at selected locations on the page so that the proper teams and scores are aligned when the page is rendered. In yet another embodiment, an object is defined having properties for the name of one team and a score associated with that team. Then, pairs of the objects are placed in the page in the proper alignment to indicate the games and scores. In another embodiment, an object is defined having properties specifying names of two teams and a separate object is defined having properties specifying two scores. In this last embodiment, the two objects are placed in the page so that the names of the teams align with the associated scores. Obviously, additional variations of these representations are possible.

Assume for the example of FIG. 4 that the names of teams in a game are specified by a "names" object having properties for the two team names and the scores in the game are specified by a "scores" object having properties for two scores. In web page 410, a names object 414 having properties set to identify the "SF 49ers" and the "STL Rams" is located directly under the "Local Sports Scores" heading. A scores object 416 having a property set to identify the score of the game as "42" to "7" is directly to the right of the names object 414. In web page 412, the properties of the second names object 418 identify the same game using slightly different terminology: "SF" and "STL." However, this names object 418 is aligned with the same scores object 416 as is utilized in web page 410.

Thus, the same scores object 416 is utilized in different positions in each web page 410, 412. In order to update the score of the San Francisco 49ers vs. St. Louis Rams football game on both web pages, the input source 210 simply sends an update message to the routing network 110 specifying the object ID for the scores object 416 and the update to the score property. The routing network 110 routes the update message to the appropriate clients 114, and the clients update the appropriate score regardless of the particular page layout.

Figure 5:
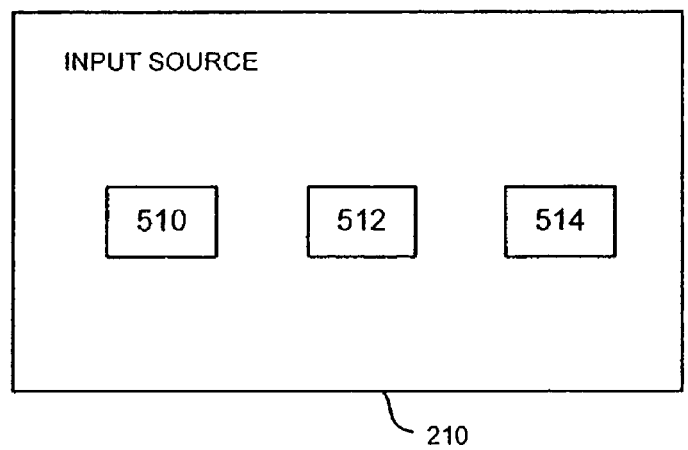
FIG. 5 is a block diagram illustrating an input source and the tools available to it for generating the update messages.

The input source 210, i.e., the information provider 108 and/or dynamic content provider 116 can use a variety of tools to generate the update messages. FIG. 5 is a block diagram illustrating an input source 210 and the tools available to it for, generating the update messages. Other tools can be utilized in addition to or instead of the ones described herein.

Preferably, the tools allow the input source 210 to access an application programming interface (API) provided by the routing network 110 for accepting messages. In one embodiment, the messages sent by the input source 210 are in the same format as utilized by the activation module 124 at the client 114. In an alternative embodiment, the messages provided to the routing network 110 are in a different format and the routing network translates the messages into the format utilized by the activation module 124.

In one embodiment, the input source 210 utilizes a data pump module 510 to access the API. The data pump module 510 reads an extensible markup language (XML) file containing one or more object IDs and the new values for the identified objects at regular intervals and automatically generates API calls that send messages representing changes to object properties to the routing network 110. In another embodiment, the data pump module 510 is event-driven and reads the XML file in response to a change in the file or some other occurrence.

In another embodiment, the input source 210 utilizes a director console module 512 to access the API. Preferably, the director console module 512 presents an administrator with a graphical interface displaying the contents of the page 118. For example, the administrator may use the director console 512 to edit textual data, images, and/or any objects or properties of objects on the web page. After editing, the administrator uses a "send update" button or similar technique to cause the director console module 512 to send messages for the changed objects and properties to the routing network 110 via the API.

In another embodiment, the information provider 108 and dynamic content provider 116 work together as the input source 210 by using a content management system module 514 to access the API. Preferably, the content management system module 514 resides at the information provider 108 and receives object property updates from the dynamic content provider 116. The content management system module 514 preferably updates the properties of the live objects in the page 118 stored at the server 112 and also sends messages for the changed properties to the routing network 110. In this manner, the page 118 at the server 112 and the web page displayed at the client 114 are updated almost simultaneously. In one embodiment, the dynamic content provider 116 sends the update messages to the routing network 110 instead of to the information provider 108. Embodiments of the system 100 can also utilize any combination of the content management techniques described herein.

For example, the tools described above can generate a message having the following code for updating the text displayed by a score object to "2":

LiveObject score=new LiveObject("Bang$home
    ScoreID");

score.setProperty("innerText", "2").

This code sets the innerText property of the object having object ID "Bang$homeScoreID" to "2." The tools use the API to pass this message to the routing network 110.

Figure 6:
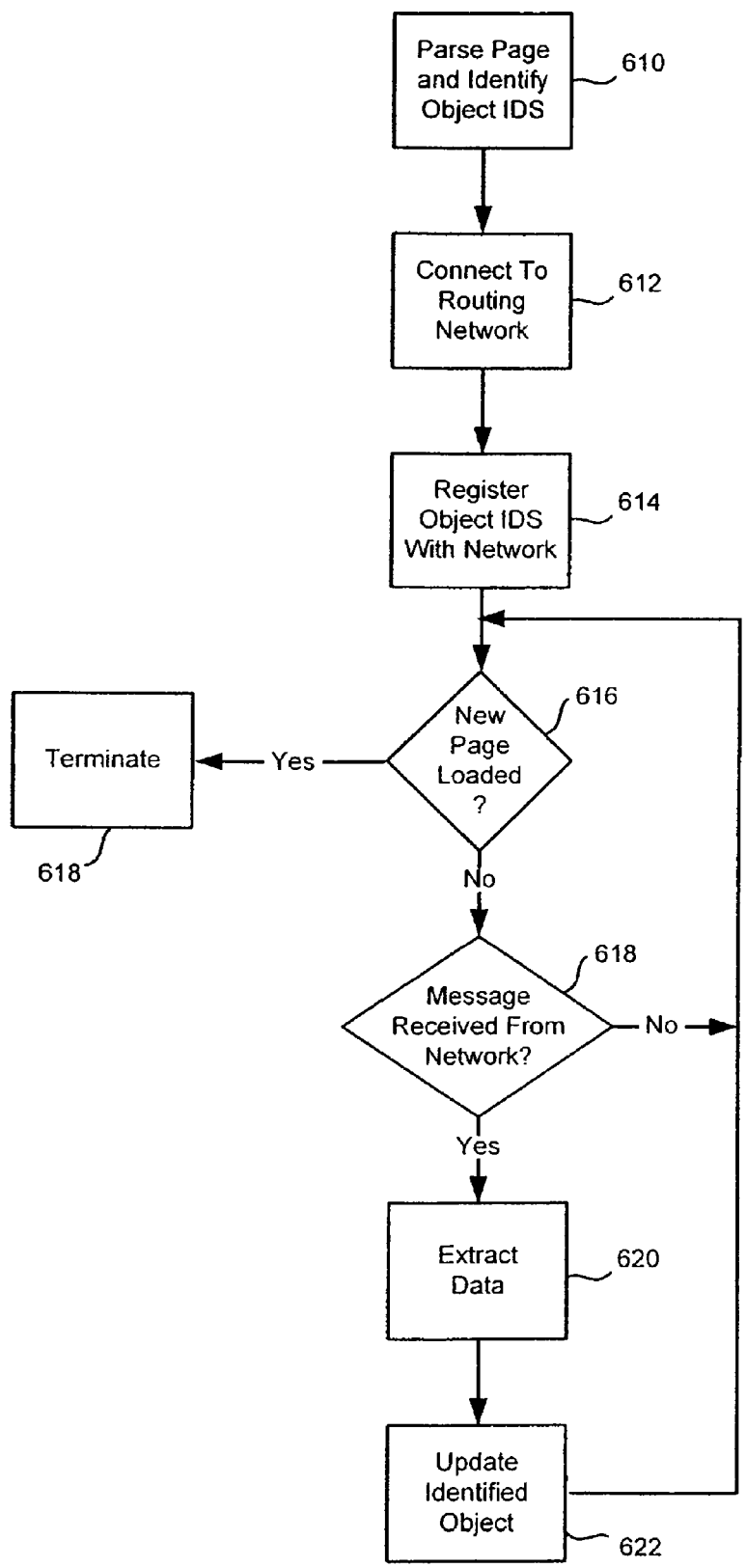
FIG. 6 is a flow chart illustrating the steps performed by an embodiment of an activation module.

Turning now to the actions performed at the client 114, FIG. 6 is a flow chart illustrating the steps performed by an embodiment of the activation module 124. Those of skill in the art will recognize that different embodiments may perform the steps of FIG. 6 in different orders. The activation module 124 generally performs three functions: register object IDs with the routing network 110, handle messages received by the client 114 from the network in order to update the properties of live objects, and control communications between the client and the network.

In order to register object IDs, the activation module 124 preferably parses 610 the page 118 received from the server 112 and identifies the object IDs of the live objects. In an alternative embodiment, the activation module 124 identifies only a subset of the object IDs, such as the IDs of only live objects that are currently being displayed by the web browser 120. Alternatively, a list of object IDs may be pre-encoded in the web page in addition to the objects themselves, thereby enabling easy identification by the activation module 124. In yet another embodiment, a user of the client 114 selects the object IDs to register.

The activation module 124 preferably opens 612 a connection between the client 114 and the routing network 110. The activation module 124 can open 612 this connection before or after the activation module receives and/or parses the page 118. In some cases, the client 114 is located behind a firewall that puts a restriction on the types of connection requests the client can make. A firewall might, for example, block all non-HTTP traffic. For this reason, the activation module 124 preferably wraps the connection request in an HTTP header in order to get the request to the routing network 110 through the firewall.

The activation module 124 uses the connection between the client 114 and routing network 110 to register 614 the object IDs by communicating to the routing network 116 a vector (e.g., a list or array) containing the identified object IDs. In order to accomplish this task through the firewall, the activation module 124 preferably puts the vector into a string, referred to as "object data," and then preferably creates an HTTP message to communicate the object data to the routing network 110. A schematic example is as follows:

POST / HTTP/1.1\r\n
Content-Length: <length of object data> \r\n
\r\n
<object data> where <object data> is the object ID list. When the routing network 110 receives such an HTTP request, it extracts the object data and updates the registry 125 to indicate that the client 114 has registered for the identified objects.

If the web browser 120 loads 616 a new page, or otherwise terminates display of the objects on the initial page, the activation module 124 associated with the initial web page preferably terminates 618 the client's connection with the routing network 110. Those of skill in the art will recognize that this termination 618 can occur asynchronously with the other steps illustrated in FIG. 6. Thus, the location of steps 616 and 618 represents only one possible place in the sequence of steps where the termination may occur.

If the connection is not terminated, the activation module 124 preferably waits until it receives 618 a message from the routing network 110 specifying an object ID and an update to a property of the identified object. In one embodiment, this message is received as HTTP data. Upon receipt of the message, the activation module 124 preferably extracts 620 the object ID and update from the HTTP data. Then, the activation module 124 updates 622 the property of the identified object, or causes the object to be updated, as specified by the message.

The sequence of receiving messages 618, extracting data 620, and updating objects 622 is preferably repeated until a new page is loaded 616 or the connection with the routing network 110 is otherwise terminated. Although not shown in FIG. 6, in certain circumstances, such as when a user action with respect to the page 118 activates a new live object, the activation module 124 may register new object IDs with the routing network 110 without first downloading and parsing a new page. In one embodiment, if the newly-loaded page contains live objects, then the process of downloading the activation module 124 and updating the objects as described by FIG. 6 is repeated. In an alternative embodiment, the activation module 124 remains active at the client 114 and, therefore, the client does not re-download the activation module from the routing network 110. Instead, the already-present activation module 124 performs the live-enabling process on the new page.

Figure 7:
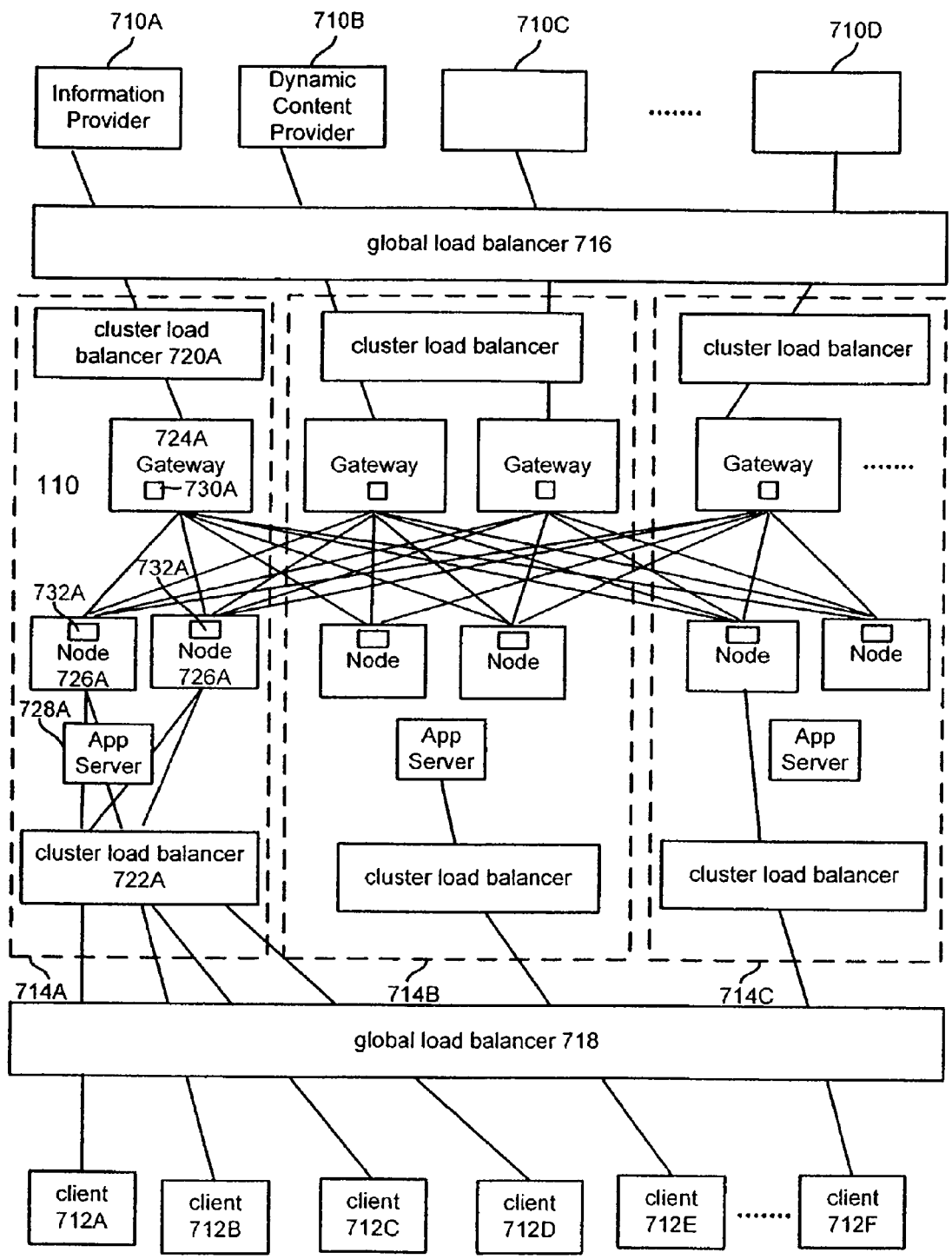
FIG. 7 is a block diagram illustrating a lower-level view of the routing network according to an embodiment.

FIG. 7 is a block diagram illustrating a lower-level view of the routing network 110 according to an embodiment of the present invention. Those of skill in the art will recognize that there are many alternative ways to implement the functionality of the routing network 110. FIG. 7 illustrates multiple input sources (labeled 710A-D) representative of sources providing messages to the routing network 110, such as an information provider 710A and a dynamic content provider 710B. FIG. 7 also illustrates multiple clients (labeled 712A-F) representative of the many clients in communication with the routing network 110 at any given instant.

Internally, the routing network 110 is preferably divided into one or more clusters 714. In FIG. 7, the routing network 110 has three clusters 714A, 714B, 714C, although the number of clusters can vary depending upon the processing needs of the network. An input-side global load balancer 716 preferably routes messages from the input sources 710 to the clusters 714. Similarly, a client-side global load balancer 718 preferably routes connection requests from the clients 712 to the clusters 714. The load balancers 716, 718 are designed to ensure that load is distributed among the clusters 714 according to a predetermined heuristic. For example, the load may be distributed evenly among the clusters 714 or a more powerful cluster may be distributed a majority of the load. In one embodiment, one load balancer performs the functions of the input-side 716 and client-side 718 load balancers and utilizes conventional Domain Name System-(DNS-) based load balancing.

Each cluster 714, of which cluster 714A is representative, preferably contains an input-side cluster load balancer 720A and a client-side cluster load balancer 722A. The cluster load balancers 720A, 722A function similarly to the corresponding global load balancers 716, 718 in that the input-side cluster load balancer 720A balances and routes incoming messages among one or more gateways 724A and the client-side cluster load balancer 722A balances and routes incoming connection requests among one or more nodes 726A and application servers 728A.

In one embodiment, the functionality of the two client-side cluster load balancers 720A, 722A is provided by one component. This single-component load balancer initially determines whether an incoming request is from an input source 710 seeking to send a message to a gateway 724A, a client 712 seeking a connection to a node 726A, or a client seeking a connection to an application server 728A. Then, the load balancer routes the messages/connection requests among the gateways 724A, nodes 726A, and application servers 728A within the cluster 714. In one embodiment, the single-component load balancer provides layer seven load balancing (i.e., load balancing at the application layer). Preferably, the load balancing for the nodes 726A and application servers 728A are performed by the same component since, for security reasons, most client web browsers only permit an application (e.g., the activation module 124) to transparently connect to the location from which the application was downloaded.

Alternative embodiments of the routing network 110 may combine the global 716, 718 and cluster 720A, 722A load balancers and/or incorporate the functionality of the load balancers into different components within or outside of the clusters 714. In addition, alternative embodiments may omit one or more of these load balancers. For example, having different clusters 714 serve different customers might obviate the need for the global load balancers 716, 718.

The gateways 724A in the cluster 714 receive the messages from the input sources 710 and direct the messages to the appropriate node or nodes 726A. In one embodiment, each gateway 724A maintains a persistent TCP connection to every node 726 in every cluster 714 and directs every message to every node. Therefore, although a gateway 724A is located inside a cluster 714A and receives connections via the cluster's input-side load balancer 720A, the gateway's scope spans the entire routing network 110. This broad scope allows messages from any input source to reach any client 712.

In an alternative embodiment of the routing network 110, each gateway 724 maintains a persistent TCP connection to all nodes 426 in the same cluster 714 and at least one connection to at least one gateway in each of the other clusters. This embodiment reduces the number of simultaneous TCP connections maintained by each gateway 724. In another alternative embodiment, each cluster 714 also includes a gatekeeper (not shown in FIG. 7) that maintains connections with the gateways 724 of other clusters. A gateway 724 forwards messages to the gatekeeper, which then distributes the messages to the gateways of other clusters 714.

Since a gateway 724 does not control the rate at which it receives messages from input sources 710, it is possible for the gateway to receive messages faster than it can process them (i.e., send the messages to the nodes). Therefore, each gateway 724 preferably maintains a queue 730 of messages that have been received but not yet processed in order to avoid losing messages. In one embodiment, the gateway 724 drops messages if the queue 730 becomes too long. In another embodiment, the gateway 724 utilizes priorities assigned to certain messages or input sources to determine which messages to drop.

The nodes 726 preferably transmit messages received from the gateways 724 to the clients 712 that have registered in the object IDs identified by the messages. If no clients 712 have registered the object ID specified by a message, the node preferably ignores the message. A node 726 preferably maintains an instance of the registry 125 as a hash table 732 containing the object IDs registered by clients 712 connected to the node. In one embodiment, the hash table 732 associates each object ID with a linked list containing one entry for each client 712 that has registered for that object ID. Each entry in the linked list preferably contains a pointer to a socket representing the connection to the corresponding client 712. As is known in the art, the pointer to the socket, typically called a "file descriptor," represents an address to which the node can write in order to send the message to the corresponding client. Preferably, the node 726 adds to the hash table 732 and/or linked list every time a client 712 registers an interest in an object and deletes the corresponding entry from the hash table and/or linked list when the client disconnects from the node or otherwise indicates that it is no longer interested in a particular object.

Alternative embodiments of the present invention utilize other data structures in addition to, or instead of, the hash table 732 and linked list, and/or may utilize different data within the data structures. For example, one embodiment of the routing network 110 has a hierarchy of nodes within each cluster 714. Different nodes in the hierarchy may handle messages received from certain input sources 210, or process messages sent to different clients 712. In this embodiment, the linked lists may point to nodes lower in the hierarchy, instead of to sockets leading to the clients 712. Another embodiment lacks the node hierarchy, yet assigns certain nodes to certain input sources 210 or clients 712.

The application server 728 within each node 714 preferably serves the activation module 124 to the clients 712 in response to client requests. In addition, the application server 728 serves any other modules that may be required or desired to support the environment 100. In an alternative embodiment of the routing network, a single application server 728 fulfills all of the client requests. This application server 728 may be within a certain cluster 714 or independent of the clusters. However, this single-application-server embodiment is less desirable because it lacks redundancy.

Preferably, the routing network 110 utilizes conventional single-processor computer systems executing the Linux operating system (OS). Preferably, each component of the routing network 110 is implemented by a separate, dedicated computer system in order to enable the separate optimization of the components. The input/output (I/O) functionality of the OS is preferably enhanced through the use of a non-blocking OS package such as NBIO available from the University of California, Berkeley, Calif. Based on the assumption that connections with the nodes 728 are long-lived, the OS is preferably configured to not allocate resources toward monitoring idle connections. Instead, the well-known /dev/poll patch is preferably applied to the OS in order to provide advanced socket polling capabilities.

Moreover, the TCP/IP stack in the OS is preferably optimized in order to quickly output messages. In one embodiment, the retransmit timer in the stack is reduced from 200 ms to 50 ms. This timer determines how long the stack waits for an acknowledgement (ack) that a sent packet was received. Due to the way the Linux kernel implements the retransmit timer, the kernel will not send pending outbound packets (even if the ack has been received) until the initial retransmit timer has expired. Reducing the retransmit value minimizes the effect of this delay. If an ack is not received before the retransmit timer expires, an embodiment of the present invention increases the retransmit value for the affected TCP connection and the unacknowledged packet is retransmitted. In addition, the TCP/IP stack preferably utilizes Nagle's algorithm functionality to concatenate a number of small messages into a larger message, thereby reducing the number of packets sent by the routing network 110.

Figure 8:
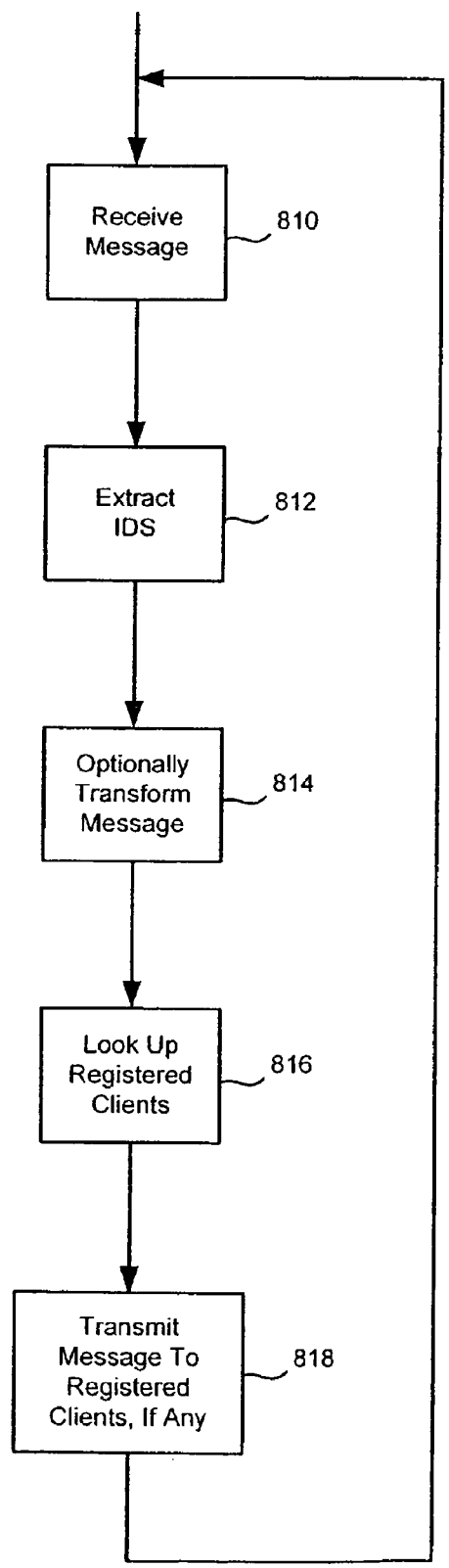
FIG. 8 is a flow chart illustrating steps performed by a node in a cluster to perform object-based routing of a message received from an input source via the gateway.

FIG. 8 is a flow chart illustrating steps performed by a node 726 in a cluster 714 to perform object-based routing of a message received from an input source via the gateway 724. Initially, the node 726 receives 810 the message from an input source 710. The node 726 extracts 812 the object ID from the message. In addition, the node 726 optionally transforms 814 the message to convert it from the format utilized by the input source 710 into the format utilized by the activation module 124 at the client 712. As described above, in one embodiment the message format utilized by the input source 710 is identical to the message format utilized by activation module 124. In this embodiment, therefore, the node 726 does not need to transform the message. In an alternative embodiment wherein the input source 710 and activation module 124 utilize different message formats, the node 726 preferably transforms the message. The node 726 looks up 816 the hash table entry corresponding to the extracted object and information provider IDs to determine the linked list of clients 712 that have registered in the object referenced by the message. Finally, the node 726 transmits 818 the message to each of the registered clients 712. In an alternative embodiment, the node 726 optionally transforms the message after, as opposed to before, looking up the registered clients in the hash table. Transforming the message at this latter stage enables the node 726 to transform the message according to the specific requirements of the registered clients 712.

Delivering Personalized Content Using the Dynamic Content Routing Network

FIG. 9 depicts an example of a page 118 according to one embodiment. In one embodiment, page 118 may be a web page. In other embodiments, page 118 may be any page generated by a software application, such as a word processing document, a spreadsheet, an email, etc. As shown, page 118 includes a plurality of sections 902, such as a market data section 902-1, a news headline section 902-2, a recent trades section 902-3, and an account balances section 902-4. Although these sections are shown, it will be understood that any number of sections may be provided in page 118.

In one embodiment, page 118 may be provided by a web-based application. Routing network 110 may be used to deliver purchase prices for stocks and bonds to a large number of clients 114. Each client's page 118 may include the same sections 902, but information for a certain section 902 may be personalized (e.g., different) for each user. For example, market data section 902-1 may be the same for all the users. However, recent trades section 902-3 and account balances section 902-4 may be personalized for each user. For example, the recent trades made by a specific user and their account balances may be personal to a user, and may only be sent to the specific user. Accordingly, personalized information may be any information specific to a user. It should be understood that different users may have personalized information that may be substantially the same; however, the personalized information for each user would be specific to each user.

In one embodiment, when a trade closes for a given user, only his/her page 118 should be updated (e.g., under the recent trades section 902-3). Accordingly, personalized information should only be sent to this user.

In one embodiment, different content for section 102 may be delivered by different input sources 210. For example, an input source 210 may provide content for news headline section 902-2 and another input source 210 for market data section 902-1. In addition, real-time data may be provided by multiple input sources 210. Input source 210 may be located remotely from routing network 110 and client 114, or may be, in other embodiments, part of routing network.

The real-time information sent to page 118 may be delivered using routing network 110. In one embodiment, each stock 904 may be assigned an ID, and messages published to that ID may be delivered to every user. A live object may be then be updated. A live object may be any data that can be updated. For example, a live object may be any data included in a data representation for page 118, such as software code for displaying an element of page 118, an element being displayed on page 118, etc. In addition to the generic information, personalized information may be delivered to recent trades section 902-3 and account balances section 902-4. Further, a combination of generic and personal information may be delivered for a section. For example, generic and personal information may be delivered to news headline section 902-2.

In one embodiment, in order to deliver personalized messages to users, a batching capability of routing network 110 may be used. In this embodiment, each user may be assigned a personalized ID. The personalized ID may be unique or specific to the user. As will be discussed below, the personalized ID may also be specific to a group of users and not just one user. The personalized ID can be put anywhere in a data representation for their page 118 (such as in the body tag of software code for page 118). Live objects in the data representation may then be associated with generic IDs. The live objects may be found in a page 118 and personalized information may be displayed for the live objects. The generic IDs may be the same for a plurality of users. For example, recent trades section 902-3 of a web-based trading application may be marked with the ID "recentTradesID". This ID may be the same for every user's page 118, even though personalized information may be displayed there for each user.

In one embodiment, input source 210 provides a batch message using the following format [personalizedID, (genericID #1, "personalized information #1"), (genericID #2, "personalized information #2")]. PersonalizedID may be an ID personalized to a user. GenericID #1 and genericID #2 may be an IDs generic across many users. Personalized information #1 and #2 may be any information that can be used to update a page. In one example, a message for account balances may be sent in the above batch message using the following message, [personalizedID, (accountbalancesID, "balance information"), . . . ]. This message may be used to update the account balance of a user's account with personalized information for the user.

Routing network 110 delivers the batch message to a user registered for the personalized ID. When the batch message arrives at a client 114 associated with the user, it may be treated as if the messages (genericID #1, "personalized information #1") and (genericID #2, "personalized information #2") were sent to client 114. The personalized ID may not be used after the message is received.

In one embodiment, the browser of client 114 evaluates a data representation for page 118 and finds the IDs of genericID #1 and genericID #2. Live objects on page 118 may be updated with personalized information #1 and #2. An information provider does not need to know or understand the structure of the user's page 118. Also, because update messages may not include any DOM information, the message itself is simple. For example, if one of the messages may be (accountbalancesID, "balance information"), the browser of the client may update account balances section 902-4 with the information as specified by the update message (i.e., the "balance information" of the update message).

Thus, personalized information for multiple users may be sent to a generic ID that may be used to update live objects included on pages 118 for multiple users. The personalized ID may be used to send personalized information to a user using the above-referenced batch message techniques. Because the live objects may have identical IDs, an input source 210 can deliver multiple personalized messages to the same generic ID for a live object. This reduces the number of IDs that may be used.

Figure 10:
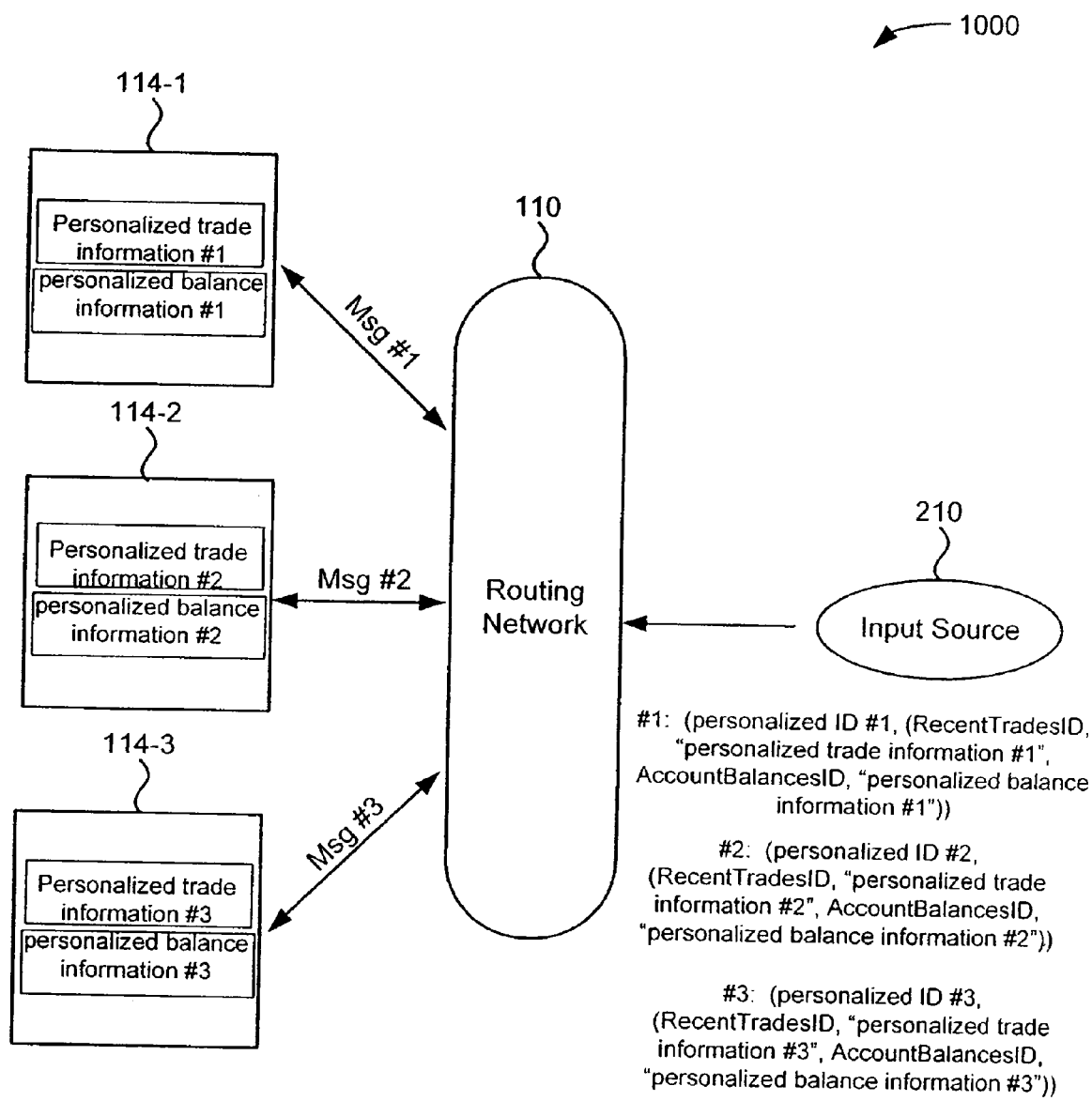
FIG. 10 depicts a system for delivering personalized messages using routing network 110 according to one embodiment.

FIG. 10 depicts a system 1000 for delivering personalized messages using routing network 110 according to one embodiment. System 1000 includes a plurality of clients 114, routing network 110, and an input source 210.

Input source 210 may be capable of sending personalized messages using the batching capability of routing network 110. As shown, three batch messages, messages #1, #2, and #3, may be sent by input source 210. Messages #1, #2, and #3 may be sent to three different personalized IDs: personalized ID #1, personalized ID #2, and personalized ID #3. A batch message includes a message sent using the generic IDs of recentTradesID and accountbalancesID. Personalized information, however, may be included in each message for the IDs of recentTradesID and accountbalancesID for different users.

The three messages may be sent from input source 210 to routing network 110. Routing network 110 determines which clients 114 have registered for the personalized IDs. As shown, a client 114-1 has registered for personalized ID #1, client 114-2 has registered for personalized ID #2, and client 114-3 has registered for personalized ID #3. Accordingly, message #1 may be sent to client 114-1 because that client 114-1 (or a user) has registered for personalized ID #1. Further, message #2 and message #3 have been sent to client 114-2 and client 114-3 because those clients 114-2 and 114-3 have registered for the corresponding personalized IDs #2 and #3, respectively. Clients 114-1, 114-2, and 114-3 can then update their pages 118 with the information provided for the IDs of recentTradesID and accountBalanceID. As shown, client 114-1 has displayed personalized trade information #1 and personalized balance information #1, client 114-2 has displayed personalized trade information #2 and personalized balance information #2, and client 114-2 has displayed personalized trade information #3 and personalized balance information #3.

Accordingly, three messages may be sent with information for the generic ID recentTradesID. However, using a batched message, the message may be sent to three different clients 114. Thus, client 114 may receive personalized information for the generic ID.

Figure 11:
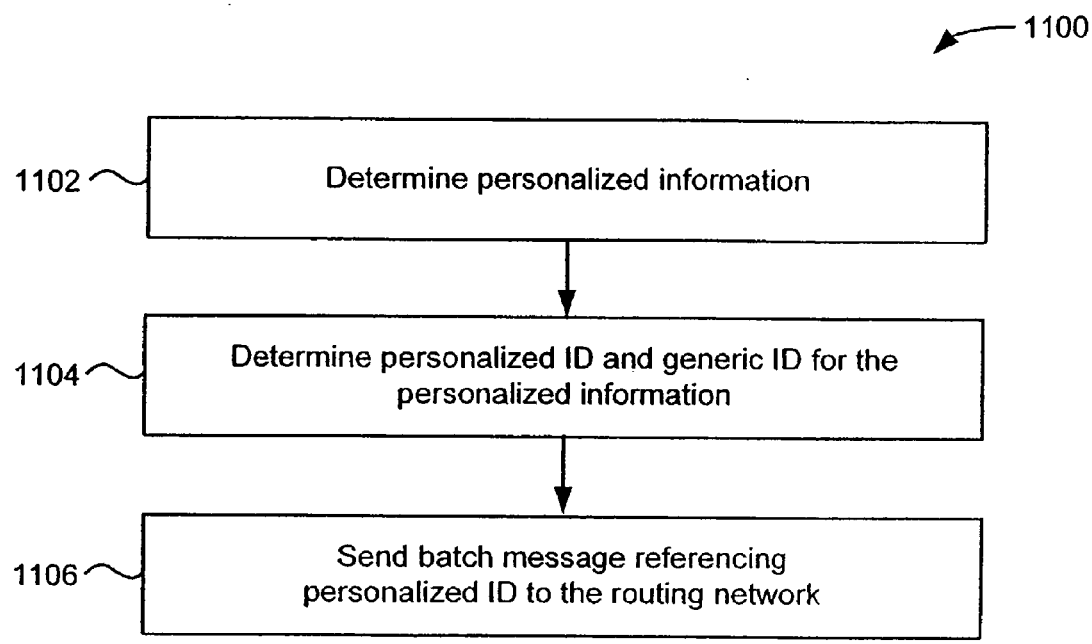
FIG. 11 depicts a simplified flowchart for generating a batch message according to one embodiment.

FIG. 11 depicts a simplified flowchart 1100 for generating a batch message according to one embodiment. In step 1102, an input source 210 determines personalized information for a user.

In step 1104, a personalized ID and generic ID for the personalized information may be determined. In one embodiment, input source 210 does not need to know where or how to send the personalized information to a user. Rather, input source 210 may associate the personalized information with a generic ID and generate a batch message that may be sent to the personalized ID.

In step 1106, a batch message may be sent with the personalized ID to routing network 110. The format of the batch message may be sent as described above or through any other formats. Accordingly, input source 210 may send a batch message to the personalized ID. How or where to route the message to a user may not need to be determined by input source 210. Rather, routing network 110 may route the batch message as described below.

Figure 12:
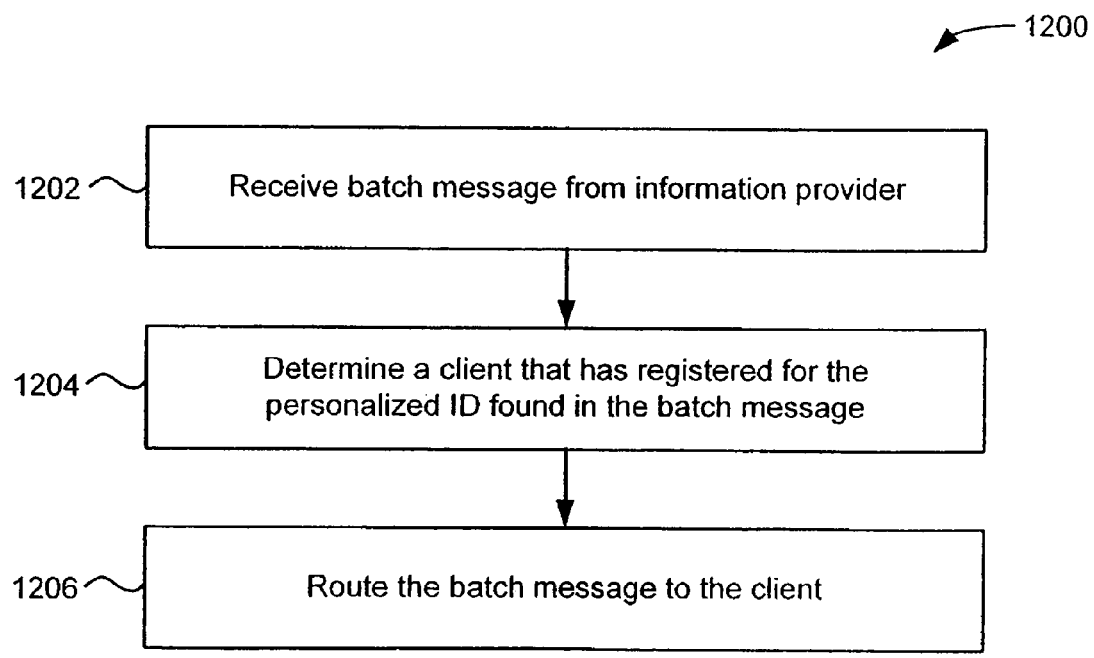
FIG. 12 depicts a simplified flowchart of a method for routing a batch message to a client according to one embodiment.

FIG. 12 depicts a simplified flowchart 1200 of a method for routing a batch message to a client 114 according to one embodiment. In step 1202, the batch message may be received from input source 210. In step 1204, a client 114 may be determined that may be registered for the personalized ID found in the batch message. In one embodiment, a client 114 may download an activation module 124 and register IDs with routing network 110. This process is described in more detail above. When a batch message is received from input source 210 for the personalized ID, routing network 110 may route the batch message to client 114 using the personalized ID in step 1206.

Figure 13:
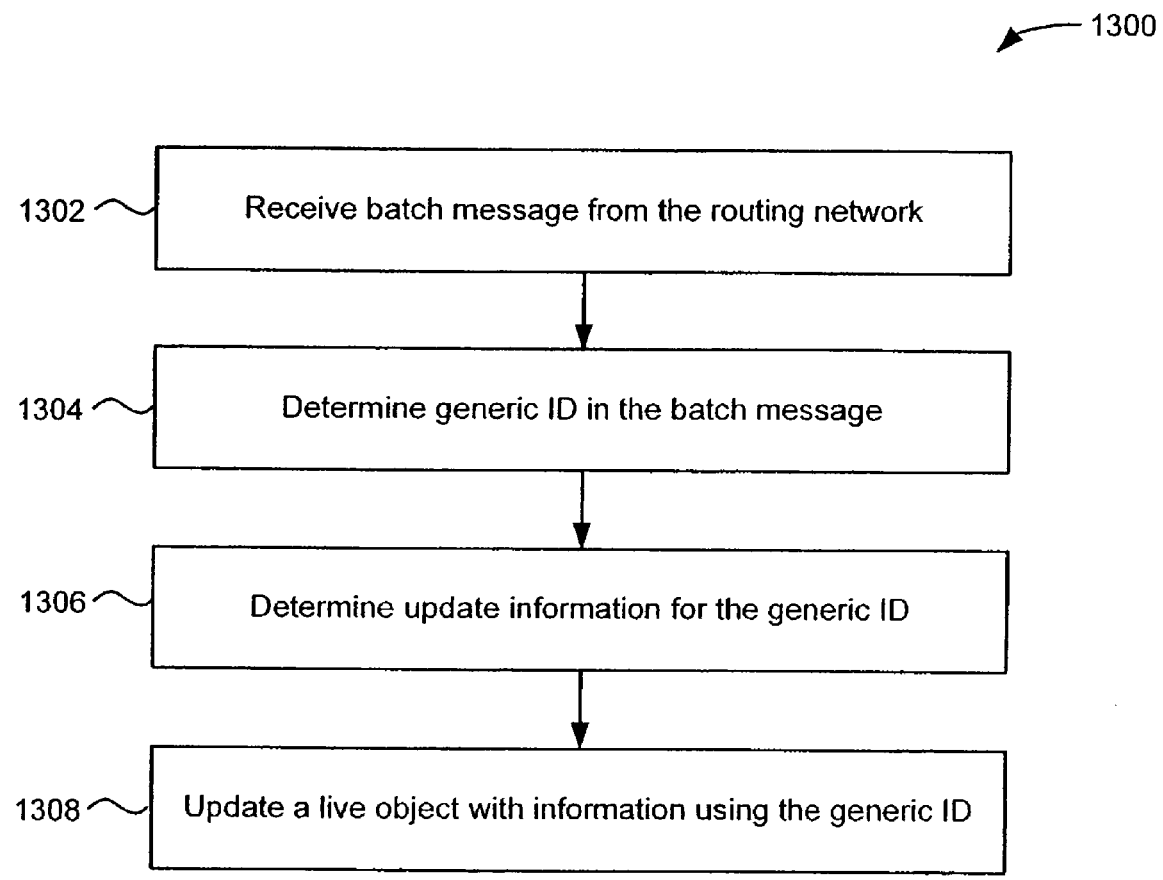
FIG. 13 depicts a simplified flowchart for a method for processing a batch message at a client according to one embodiment.

FIG. 13 depicts simplified flowchart 1300 for a method for processing a batch message at a client 114 according to one embodiment. In step 1302, a batch message may be received from routing network 110. The batch message may be directed to a personalized ID and routed according to preferences associated with the personalized ID. For example, the personalized ID may be associated with an IP address and the message may be received at a client 114 corresponding to that IP address.

In step 1304, a generic ID in the batch message may be determined. This generic ID may be the same ID that may be found on multiple users' pages 118.

In step 1306, personalized information for the generic ID may be determined. For example, the personalized information may be personalized information and may be specific to the client 114.

In step 1308, a live object may be updated with the personalized information using the generic ID. For example, client 114 may determine a live object on page 118 that may be associated with the generic ID. A property of a live object may be updated with the personalized information.

For example, referring to FIG. 9, a live object may be found in recent trades section 902-3 of page 118. A recentTradesID may be included in a data representation for page 118. Client 114 thus displays the personalized information corresponding to a position as referenced by the ID of recentTradesID in the data representation for page 118. Accordingly, routing network 110 or the input source 210 may not need to understand the structure or DOM of a user's page 118. Client 114 may be able to update recent trade section 902-3 as specified by the personalized information for recentTradesID.

The same generic ID may also be used in cases where some messages may be intended for a wide audience (e.g., not personal) and others may be personalized, such as in news headline section 902-2 of page 118. For example, input source 210 may send standard headlines to users, using a generic ID, such as the following message, <NewsheadlineID>, <"News headline information">, and send personalized messages using a batch message, such as [<personalized ID>, (<NewsheadlineID>, <"Personalized news headline information">)]. The first message may send news headline information to any users that subscribe to the ID of NewsheadlineID and the second message may send personalized-news headline information to the user associated with personalizedID. Accordingly, the same generic ID may be used to send standard headlines that may be sent to all users. The generic ID may also be used as a personalized ID by sending a batch message to the personalized ID for a user. Personalized headlines may be sent to a user associated with the personalized ID. An information provider 210 may switch back and forth between standard headlines and personalized headlines for generic IDs.

The batch message may also be used to send semi-personalized messages, i.e., messages to groups rather than individuals. Just as an individual user may have a live object associated with the personalized ID somewhere on his/her page 118, members of a group can have a live object for a group personalized ID located on their pages 118. To send a group of users a message within the news headline section 902-2 of their pages 118, information provider 214 may use a batch message sent to a group personalized ID, such as [<groupPersonalizedID>, (<newsheadlineID>, <"personalized group headline information">)]. All (and only) members of the group may receive this message because they may be associated with the group personalized ID. This technique may not require that members of the group are viewing identical pages. Rather, members of the group may display the information for newsheadlineID in whichever way they desire.

Accordingly, a batch message may be used to send personalized information that may be associated with generic IDs; however, the batch message may be sent to a personalized ID specific to a user. Accordingly, the number of IDs used by a content provider 214 may be minimized. However, the power of sending personalized messages may still be maintained using the personalized IDs.

In one embodiment, the term "and/or" may indicate that any combination of elements connected by "and/or" may be used. For example, two words or expressions in a phrase using "and/or" may mean one or the other or both. In one embodiment, the term "substantially" may mean being largely but not wholly that which may be specified, or all that may be specified. In one embodiment, the term capable of may mean configured, adapted, able, etc. For example, the term capable of performing an action may mean an element may be able to perform the action, may be configured to perform the action and/or may be adapted to perform the action.

Embodiments of the disclosure can be implemented in the form of control logic in software or hardware or a combination of both. The control logic may be stored in an information storage medium as a plurality of instructions adapted to direct an information processing device to perform a set of steps disclosed in one embodiment. Based on the disclosure and teachings provided herein, a person of ordinary skill in the art will appreciate other ways and/or methods to implement the disclosure.

The above description is illustrative but not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

What is claimed is:

1. A system for dynamically updating objects with customized information for client devices, the system comprising:
   a network node configured to:
   receive a first message from an input source identifying a first identifier and a second identifier, the first message containing customized information for updating a property of an object associated with the second identifier, the object registered to at least one of the client devices based on loading of a webpage by the at least one of the client devices;
   identify the client device specific to the first identifier; and
   route a second message through a network to the client device specific to the first identifier, the second message identifying the first identifier and second identifier, and the second message containing customized information for updating a property of the object associated with the second identifier.

2. The system of claim 1, wherein the client device is configured to cause an update to the property of the object associated with the second identifier using the customized information.

3. The system of claim 1, wherein the second identifier is generic to a plurality of client devices.

4. The system of claim 1, wherein the node is further configured to:
   receive a third message from the input source identifying a third identifier and a fourth identifier, the third message containing customized information for updating a second property of a second object associated with the fourth identifier;

identify a second client device specific to the third identifier; and
route a fourth message through the network to the second client device specific to the third identifier, the fourth message identifying the third identifier and second fourth identifier, and the fourth message containing customized information for updating the second property of the second object associated with the fourth identifier.

5. The system of claim 1, wherein:
the node is configured to send the customized information to one or more additional client devices using the second identifier, and
the node is configured to use customized identifiers unique to each additional client device to route the customized information.

6. The system of claim 1, wherein:
the first message includes additional information for updating one or more properties of one or more objects associated with one or more additional identifiers, and
the second message identifies the one or more additional identifiers, the second message including the additional information for updating one or more properties of one or more objects associated with one or more additional identifiers.

7. The system of claim 6, wherein the one or more additional identifiers are associated with customized content specific to the client device or content generic to a plurality of client devices.

8. The system of claim 1, wherein the object is included in a data representation at the client device.

9. The system of claim 8, wherein the data representation comprises a web page or an application program.

10. The system of claim 1, wherein the first and second messages are substantially similar.

11. A method for dynamically updating objects with customized information for client devices, the method comprising:
receiving, through a computer routing network, a first message from an input source containing a first identifier and a second identifier, the first message containing customized information for updating a property of an object that is associated with the second identifier and that is registered to at least one of the client devices based on loading of a webpage by the at least one of the client devices;
identifying a client device specific to the first identifier; and
routing, using the network, a second message to the client device specific to the first identifier, the second message identifying the first identifier and the second identifier, the second message containing customized information for updating a property of the object associated with the second identifier.

12. The method of claim 11, further comprising causing an update to the property of the object associated with the second identifier using the customized information.

13. The method of claim 11, wherein receiving the first message includes receiving the second identifier, and wherein the second identifier is generic to a plurality of client devices.

14. The method of claim 11, further comprising:
receiving a third message from the input source containing a third identifier and a fourth identifier, the third message containing customized information for updating a second property of a second object associated with the fourth identifier;
identifying a second client device specific to the third identifier; and
routing a fourth message through the network to the second client device specific to the third identifier, the fourth message containing the third identifier and fourth identifier, the fourth message containing customized information for updating the second property of the second object associated with the fourth identifier.

15. The method of claim 11, further comprising sending customized information to one or more additional client devices using the second identifier, and further comprising using at least one customized identifier unique to the one or more additional client devices to route the customized information.

16. The method of claim 11, wherein receiving the first message includes receiving additional information for updating one or more properties of one or more objects associated with one or more additional identifiers, and wherein routing the second message includes using the one or more additional identifiers in the second message, the second message including the additional information for updating one or more properties of one or more objects associated with one or more additional identifiers.

17. The method of claim 16, wherein routing the second message associates one or more additional identifiers with customized content specific to the client device or content generic to a plurality of client devices.

18. The method of claim 11, further comprising causing the object to be included in a data representation at the client device.

19. The method of claim 18, wherein causing the object to be included in a data representation includes causing the object to be represented in a web page or an application program.

20. The method of claim 11, wherein routing the second message includes routing a message that is substantially similar to the first message.

21. A method for using a computer routing network to dynamically update objects with customized content for client devices, the method comprising:
receiving, using the computer routing network, a first registration request for a first customized identifier and a generic identifier from a first client device based on loading of a webpage by the first client device;
receiving, using the network, a second registration request for a second customized identifier and the generic identifier from a second client device based on loading of a second webpage by the second client device;
determining first customized information for the first client device;
associating the first customized information with the generic identifier;
determining second customized information for the second client device;
associating the second customized information with the generic identifier;
generating a first message including the first customized identifier and the generic identifier, the first message including the first customized information associated with the generic identifier;
generating a second message including the second customized identifier and the generic identifier, the second message including the second customized information associated with the generic identifier;
sending, using the network, the first message to the first client device using the first customized identifier, wherein the first client device is capable of causing an update to a property of a first object associated with the generic identifier using the first customized information; and sending, using the network, the second message to the second client device using the second customized identifier, wherein the second client device is capable of causing an update to a property of a second object associated with the generic identifier using the second customized information.

22. The method of claim 21, wherein the first registration request is sent after the first client device has loaded the webpage, and wherein the second registration request is sent after the second client has loaded the second webpage.

23. A client device configured to dynamically update an object with customized content, the client device comprising:
    logic configured to receive, at the client device, a message, from a routing network, identifying a first identifier and a second identifier, the message containing customized information for updating a property of an object associated with the second identifier, the first identifier being specific to the client device and the second identifier being generic to the client device and one or more additional client devices, and the object registered to the client device based on loading of a webpage by the client device;
    logic configured to identify, at the client device, the customized information for updating a property of the object associated with the second identifier; and
    logic configured to cause an update, at the client device, to the property of the object using the customized information.

24. The client device of claim 23, wherein the logic configured to receive the message includes logic configured to receive additional information for updating one or more properties of one or more objects associated with one or more additional identifiers.

25. The client device of claim 23, wherein the client device registers for the object after the client has loaded the webpage.

26. The client device of claim 23, wherein the logic configured to register automatically for an object is further configured to register for an object that is included in a data representation at the client device.

27. The client device of claim 26, wherein the logic configured to register automatically for an object is further configured to register for an object that includes a web page or an application program.

28. A system for dynamically updating objects with customized information for client devices, the system comprising:
    a node within a computer routing network, wherein the node is configured to:
        receive a registration message from at least one of the client devices after the at least one client device has loaded a webpage;
        assign a customized ID to at least one of client devices;
        update a registry indicating the objects registered respectively for the client devices;
        receive update messages from a content provider identifying the objects and containing data for updating properties of the objects,
        access the registry and determine which client devices have registered for each at least one of objects;
        generate batch update messages respectively for the client device devices that have registered for an identified object, the batch update messages respectively containing the customized ID associated with the client device, containing a plurality of generic IDs associated with the identified object, and containing a plurality of customized IDs associated with the generic IDs and customized for at least one of the client devices; and
        route the update messages to the client devices determined to have registered for the objects.

29. The system of claim 28, wherein the node is configured to assign the customized ID to a group of client devices.

30. The system of claim 17, wherein the node is configured to generate batch update messages that assign the generic IDs to stocks or bonds for a user, and wherein the node is configured to receive update messages when a trade closes for a user.

31. The system of claim 28, wherein the node is configured to operate with a number of client devices that send registration messages for objects, and wherein the number of client devices dynamically changes in real-time as the client devices load webpages.

32. A method for using a computer routing network for dynamically updating objects with customized content for client devices, the method comprising:
    receiving, using the network, a registration request from at least one of a plurality of client devices, wherein the registration request comprises requests for a customized identifier, a first generic identifier, and a second generic identifier, and wherein the registration request is sent based on loading of a webpage by the client device;
    determining first customized information for the client device and associating the first customized information with the first generic identifier;
    determining second customized information for the client device and associating the second customized information with the second generic identifier;
    generating a message including the customized identifier, the first generic identifier, the first customized information, the second generic identifier, and the second customized information; and
    sending, using the network, the first message to the client device using the customized identifier, wherein the first message is configured to cause the client device to update a property of a first object associated with the first generic identifier using the first customized information, and to update a property of a second object associated with the second generic identifier using the second customized information.

* * * * *

UNITED STATES PATENT AND TRADEMARK OFFICE
CERTIFICATE OF CORRECTION

| | | |
|---|---|---|
| PATENT NO. | : 7,930,362 B2 | Page 1 of 1 |
| APPLICATION NO. | : 11/205233 | |
| DATED | : April 19, 2011 | |
| INVENTOR(S) | : Rumelhart | |

It is certified that error appears in the above-identified patent and that said Letters Patent is hereby corrected as shown below:

Page 2, item (56), under "Other Publications", in Column 2, Line 8, delete "Retrived" and insert -- Retrieved --.

Page 3, item (56), under "Other Publications", in Column 1, Line 39, delete "NET" and insert -- .NET --.

Page 3, item (56), under "Other Publications", in Column 1, Line 42, delete "hmtl" and insert -- html --.

Column 21, line 5, in Claim 4, delete "and second" and insert -- and --.

Column 21, line 32, in Claim 9, delete "web page" and insert -- webpage --.

Column 22, line 30, in Claim 19, delete "web page" and insert -- webpage --.

Column 23, line 43, in Claim 27, delete "web page" and insert -- webpage --.

Column 24, line 5, in Claim 28, delete "for each at least one of" and insert -- for at least one of the --.

Column 24, line 7, in Claim 28, delete "device devices" and insert -- devices --.

Column 24, line 17, in Claim 30, delete "claim 17," and insert -- claim 28, --.

Signed and Sealed this
Second Day of August, 2011

David J. Kappos
*Director of the United States Patent and Trademark Office*